(12) United States Patent
Saito et al.

(10) Patent No.: US 8,026,813 B2
(45) Date of Patent: Sep. 27, 2011

(54) INDIVIDUAL MANAGEMENT SYSTEM

(75) Inventors: Yumiko Saito, Kanagawa (JP); Mayumi Yamaguchi, Kanagawa (JP); Konami Izumi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 432 days.

(21) Appl. No.: 12/053,950

(22) Filed: Mar. 24, 2008

(65) Prior Publication Data

US 2008/0238663 A1 Oct. 2, 2008

(30) Foreign Application Priority Data

Mar. 26, 2007 (JP) ................................ 2007-080383

(51) Int. Cl.
*G08B 13/14* (2006.01)
(52) U.S. Cl. ............... 340/568.6; 340/572.1; 340/568.7; 340/539.11; 340/539.13; 340/686.1; 340/686.6
(58) Field of Classification Search .... 340/568.6–572.1, 340/539.1–539.15, 686.1, 686.6
See application file for complete search history.

(56) References Cited

U.S. PATENT DOCUMENTS

| | | | |
|---|---|---|---|
| 6,366,202 B1 | 4/2002 | Rosenthal | |
| 6,529,142 B2 * | 3/2003 | Yeh et al. | 340/988 |
| 6,573,833 B1 | 6/2003 | Rosenthal | |
| 6,734,795 B2 | 5/2004 | Price | |
| 6,788,199 B2 | 9/2004 | Crabtree et al. | |
| 6,956,475 B1 | 10/2005 | Hill | |
| 7,010,498 B1 | 3/2006 | Berstis | |
| 7,148,801 B2 | 12/2006 | Crabtree et al. | |
| 7,195,381 B2 * | 3/2007 | Lynam et al. | 362/494 |
| 2005/0046580 A1 * | 3/2005 | Miranda-Knapp et al. | 340/686.1 |
| 2006/0087432 A1 * | 4/2006 | Corbett, Jr. | 340/572.1 |
| 2006/0139155 A1 * | 6/2006 | Kim | 340/426.18 |
| 2007/0013510 A1 | 1/2007 | Yamada et al. | |
| 2009/0058685 A1 * | 3/2009 | McCall et al. | 340/995.24 |

FOREIGN PATENT DOCUMENTS

| | | |
|---|---|---|
| JP | 2005-003627 | 1/2005 |
| JP | 2006-071516 | 3/2006 |
| JP | 2006-308493 | 11/2006 |
| JP | 2006308493 A | 11/2006 |
| JP | 2007-017414 | 1/2007 |

OTHER PUBLICATIONS

PCT International Search Report (Application No. PCT/JP2008/055614) mailed Jun. 24, 2008; 2 pages.
PCT Written Opinion (Application No. PCT/JP2008/055614) mailed Jun. 24, 2008; 3 pages.

* cited by examiner

*Primary Examiner* — Brent Swarthout
(74) *Attorney, Agent, or Firm* — Fish & Richardson P.C.

(57) ABSTRACT

To provide an individual management system for managing products with the use of an automatic identification technology using a wireless communication device. In the individual management system, an individual management device is attached to a managed object, an individual identification device can wirelessly communicate with the individual management device, and an individual information management device can communicate with the individual identification device. The individual management device includes a detection portion such as a sensor. The individual identification device includes a position analysis portion which calculates a distance between the individual management device and the individual identification device. Information on the distance between the individual management device and the individual identification device, and information from the detection portion included in the individual management device are transmitted to the individual identification device. Accordingly, a system user can specify a position of the individual management device accurately.

30 Claims, 17 Drawing Sheets

INDIVIDUAL MANAGEMENT SYSTEM

TECHNICAL FIELD

The present invention relates to an individual management system including an individual management device, an individual identification device, and an individual information management device.

BACKGROUND ART

In recent years, an automatic identification technology using wireless communication has been actively developed and has been introduced into some fields. The automatic identification technology includes a wireless communication device which stores information in an electronic circuit, a reader/writer which reads and writes information stored in the wireless communication device, and a higher-order system which performs processing of read information, control of the reader/writer, and the like. The wireless communication device is referred to as various names such as an RFID tag, an IC tag, and a wireless tag. Further, the wireless communication device often has no battery. In such a case, the wireless communication device is operated by an electromagnetic wave emitted from the reader/writer and wirelessly communicates with the reader/writer. As the higher-order device for controlling the wireless communication device and the reader/writer, a computer is typically used and communicates with the reader/writer through a parallel port, a serial port (typically, a universal serial bus (USB) port), or the like. The automatic identification technology has been expected as a technology for comprehensively managing production, distribution, and retail of products. Therefore, a wireless communication device which is inexpensive, small, and highly convenient has been developed.

Along with the development of the automatic identification technology, the automatic identification technology is applied not only to manage distribution but also to a system for managing personal belongings and searching a lost article (e.g., Patent Document 1: Japanese Published Patent Application No 2005-003627). A lost article searching system in Patent Document 1 is a system that can detect a position of an object to be searched by attaching a wireless communication device to the object to be searched and specifying a position of the wireless communication device.

DISCLOSURE OF INVENTION

One object of the invention is to provide an individual management system for easily managing personal belongings and the like in a limited area such as in a room with the use of the automatic identification technology using the wireless communication device as described above.

Another object of an individual management system of the invention is to easily identify a position of user's belongings in a region with a certain area, such as in a room.

Still another object of the individual management system is to allow a user to identify a position of a managed object accurately by obtaining a distance from the user who has an individual identification device to the managed object having an individual management device, a direction in which the managed object exists based on the user with the individual identification device, and information on surroundings of the managed object (e.g., information on brightness or temperature).

An individual management system of the invention includes an individual management device, an individual identification device capable of wirelessly communicating with the individual management device, and an individual information management device capable of communicating with the individual identification device. The individual management device which is attached to a managed object includes a detection portion such as a sensor. The individual identification device includes a position analysis portion which calculates a distance between the individual management device and the individual identification device. From a calculated distance between the individual management device and the individual identification device and information from the detection portion, which is obtained from the individual management device, a system user can specify a position of the managed object to which the individual management device is attached.

According to the invention, information on surroundings of the managed object can be obtained. Thus, a position of the managed object is more easily identified. Further, a position of the managed object can be identified more accurately, and the managed object can be managed more accurately.

BEST MODE FOR CARRYING OUT THE INVENTION

Figure 1:
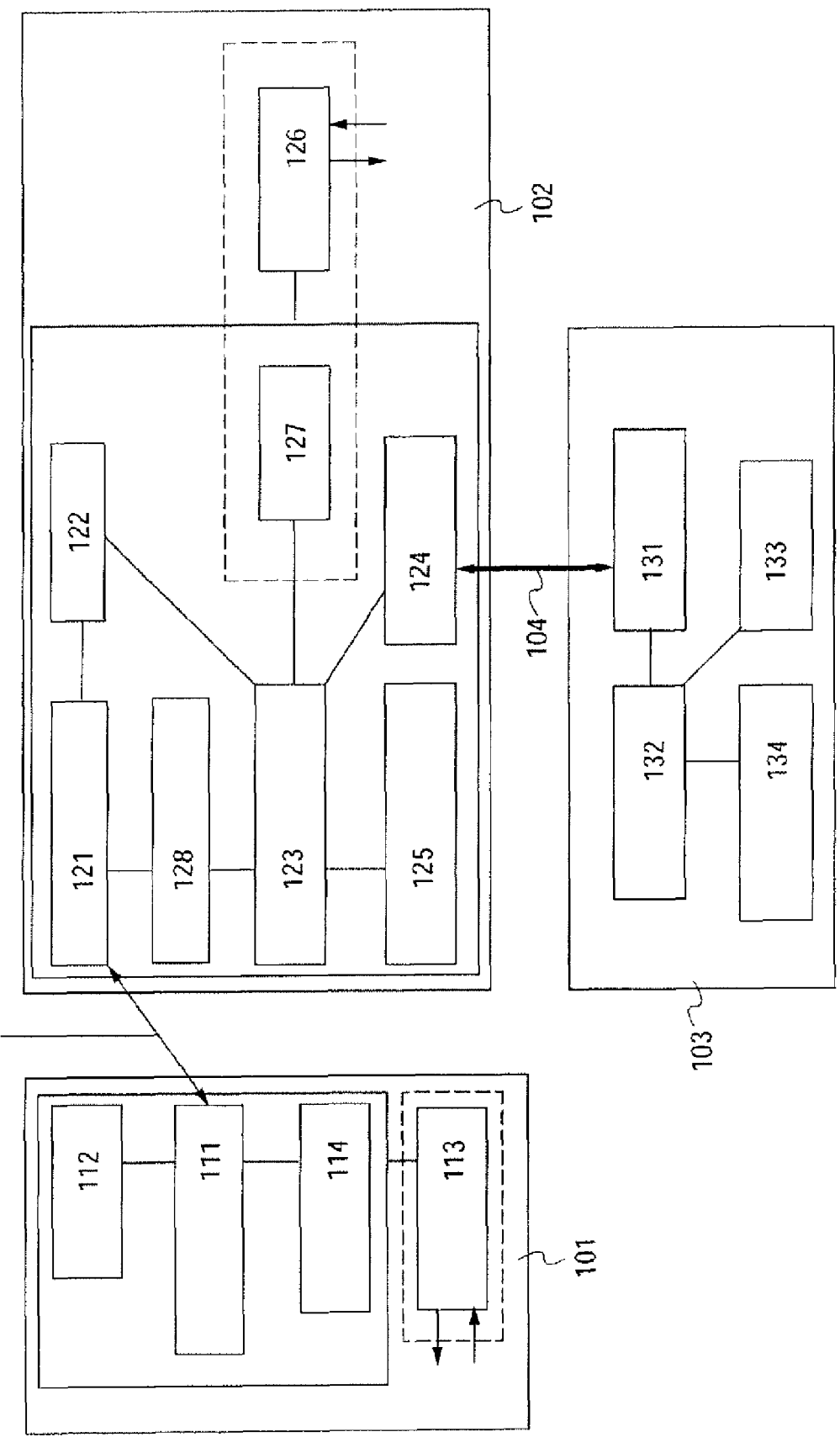
FIG. 1 illustrates a system of the invention.

Hereinafter, embodiment modes and embodiments of the present invention will be described with reference to drawings. However, the present invention is not limited to the following description, and it is easily understood by those skilled in the art that modes and details can be variously changed without departing from the scope and the spirit of the present invention. Therefore, the present invention is not construed as being limited to the following description of the embodiment modes and embodiments. Note that in describing structures of the present invention with reference to drawings, the same reference numerals are used in common for the same portions in different drawings.

Embodiment Mode 1

In this embodiment mode, an example of structures and functions of an individual management system of the invention is described with reference to drawings. One example of the invention described in this embodiment mode is an individual management system for managing a product mainly in a limited area, such as in a room, by using an individual identification technology with the use of a wireless communication device.

FIG. 1 shows an example of an individual management system described in this embodiment mode. The individual management system shown in FIG. 1 includes an individual management device 101, an individual identification device 102, and an individual information management device 103. It is preferable that the individual identification device 102 and the individual information management device 103 communicate with each other through a communication line 104 that is connected therebetween; however, the individual identification device 102 and the individual information management device 103 are not limited to performing wire communication as long as they have a structure capable of communication, and may wirelessly communicate with each other.

The individual management device 101 is a semiconductor device that has pieces of identification information to be attached to respective managed objects for identifying one managed object from a plurality of managed objects, and can wirelessly communicate with the individual identification device 102.

The individual identification device 102 identifies a specific individual management device from a plurality of individual management devices attached to respective managed objects. The individual identification device 102 should have a structure capable of wirelessly communicating with the individual management device 101.

The individual management device 101 and the individual identification device 102 have a structure for performing wireless communication. As a transmission medium used for wireless communication between the individual management device 101 and the individual identification device 102, electromagnetic waves of about 13 MHz, 900 MHz, or 2 GHz are utilized. A transmission protocol thereof can be realized based on ISO/IEC 18000-3, ISO/IEC 18000-4, or ISO/IEC 18000-6, for example.

The individual information management device 103 correlates identification information included in the individual management device 101 attached to a managed object with a name of the managed object and stores the information as individual information. It is possible that the individual information management device 103 is provided in the individual identification device 102 instead of externally from the individual identification device 102.

Note that individual information refers to identification information of a registered managed object, the name of the managed object, and the like which are stored in the individual information management device 103. When a passport is described as an example of the managed object, the word "passport" corresponds to the name of the managed object. In this embodiment mode, the name is not necessarily limited to a generic name of the product, and various names can be given to the product depending on applications of a user. When the user's name is "Taro", the name "Taro's passport" can be given to the product.

An operation of the system shown in FIG. 1 is briefly described. First, a system user designates a specific managed object (here, referred to as a managed object A) from individual information stored in the individual information management device 103. When the specific managed object A is designated, the individual information management device 103 demands that the individual identification device 102 communicate with the individual management device 101 attached to the managed object A. Then, the individual identification device 102 wirelessly communicates with the individual management device 101 attached to the managed object A, so that the user can obtain information on a position of the managed object A from information transmitted from the individual management device 101.

An application mode of an individual management system of the invention is briefly described. In this system, first, a registration operation is performed. Here, the registration operation refers to an operation in which the individual management device is attached to a managed object and individual information corresponding to the managed object is stored in the individual information management device. By repeating the registration operation, a plurality of managed objects may be registered in the individual information management device 103.

When the user desires to search a registered managed object, the user selects a managed object to be searched from the individual information stored in the individual information management device 103. The individual information management device 103 demands that the individual identification device 102 communicate with the individual management device 101 attached to the managed object. The individual identification device 102, which accepts the demand by the individual information management device 103, wirelessly communicates with the designated individual management device 101 so that a position of the managed object can be identified.

Note that in this specification, an operation for identifying the location of the managed object as described above is referred to as "usage".

In addition, identification information refers to information for specifying one managed object among a plurality of managed objects stored in the individual management device 101 and, for example, may correspond to an identification number and the like.

Next, the registration operation is described in detail in consideration of relations with functions and structures of the individual management device 101, the individual identification device 102, and the individual information management device 103.

First, identification information is stored in the individual management device 101, and the individual management device 101 and the individual identification device 102 communicate with each other. Specifically, by a demand for information from the individual identification device 102, the individual management device 101 transmits unique identification information to the individual identification device 102. The individual management device 101 includes a wireless communication portion 111 for wirelessly communicating with the individual identification device 102, a storage portion 112 for storing identification information, and a detection portion 114. Further, the individual management device 101 may include a power storage portion 113 in order to secure driving power for the individual management device 101 itself.

Figure 2A:
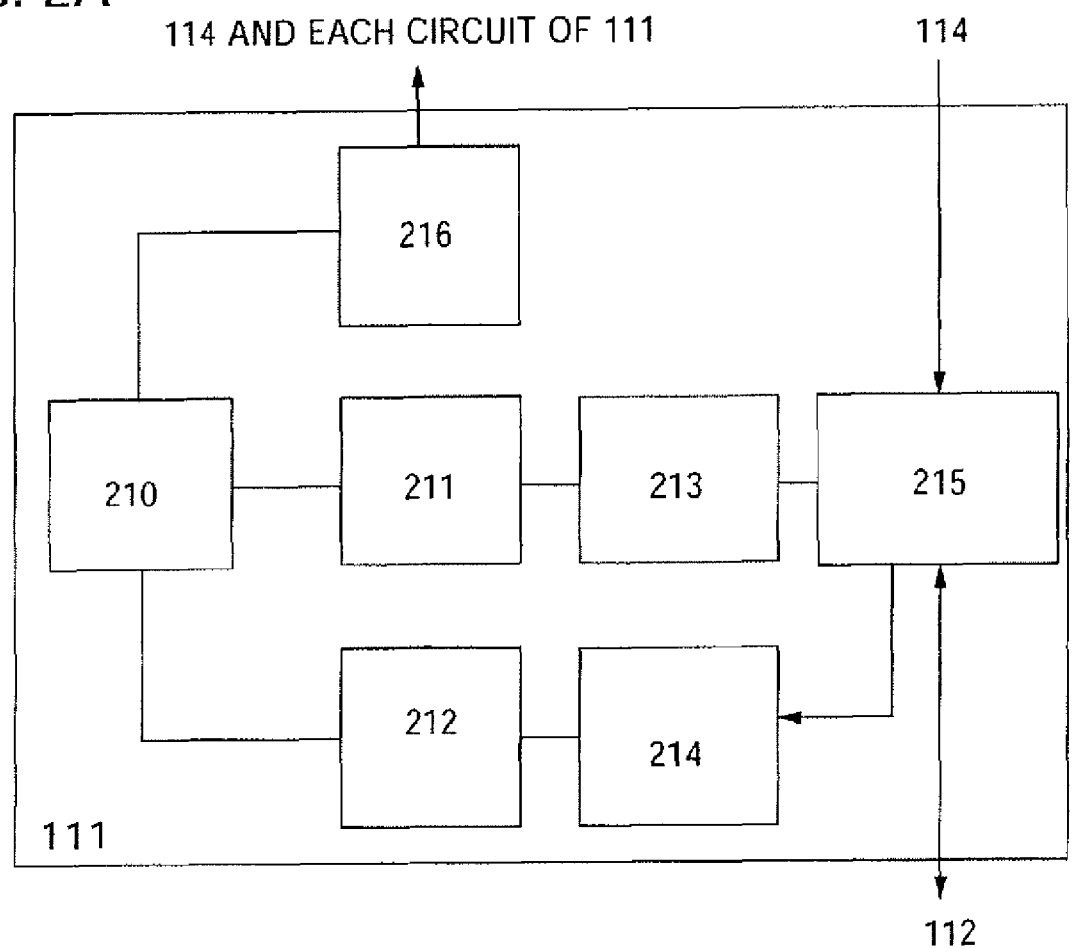
FIGS. 2A and 2B each illustrate a system of the invention.

The wireless communication portion 111 is described with reference to FIG. 2A. The wireless communication portion 111 includes a resonant circuit 210, a demodulation circuit 211, a modulation circuit 212, a decoding circuit 213, an encoding circuit 214, a logic circuit 215 such as a storage control circuit, and a power supply circuit 216. The resonant circuit 210 includes an antenna, or an antenna and a capacitor. Induced electromotive voltage generated in the antenna included in the resonant circuit 210 is rectified and stored in the capacitor. The power stored in the capacitor is supplied as power for driving the whole individual management device 101. Therefore, the power supply circuit 216 includes a rectifier circuit and a capacitor, and may also include a current/voltage control circuit for controlling rectified power.

A carrier wave received by the antenna is input to and demodulated by the demodulation circuit 211, and a signal transmitted from the individual identification device 102 is extracted. Since the extracted signal is encoded by a specific method, the signal is decoded by the decoding circuit. Then, the logic circuit 215 determines whether the decoded signal is correct or determines what kind of signal is to be sent back from the individual management device 101, for example. When the logic circuit 215 determines that a reply should be sent, information in the storage portion 112 is read out. The read information is encoded by the encoding circuit 214. Then, the information is input to and modulated by the modulation circuit 212 and transmitted to the individual identification device 102 through the antenna.

The resonant circuit 210 is connected to the demodulation circuit 211, and the demodulation circuit 211 is connected to the encoding circuit 214 so that the wireless communication portion 111 functions as described above. Further, the encoding circuit 214 is connected to the logic circuit 215. The logic circuit 215 controls the storage portion 112, and data in the storage portion 112 is transmitted to the logic circuit 215 as needed. An output signal of the logic circuit 215 is transmitted to the encoding circuit 214. A signal encoded by the encoding circuit 214 is transmitted to the modulation circuit 212. A signal modulated by the modulation circuit 212 is transmitted to the resonant circuit 210.

Figure 2B:
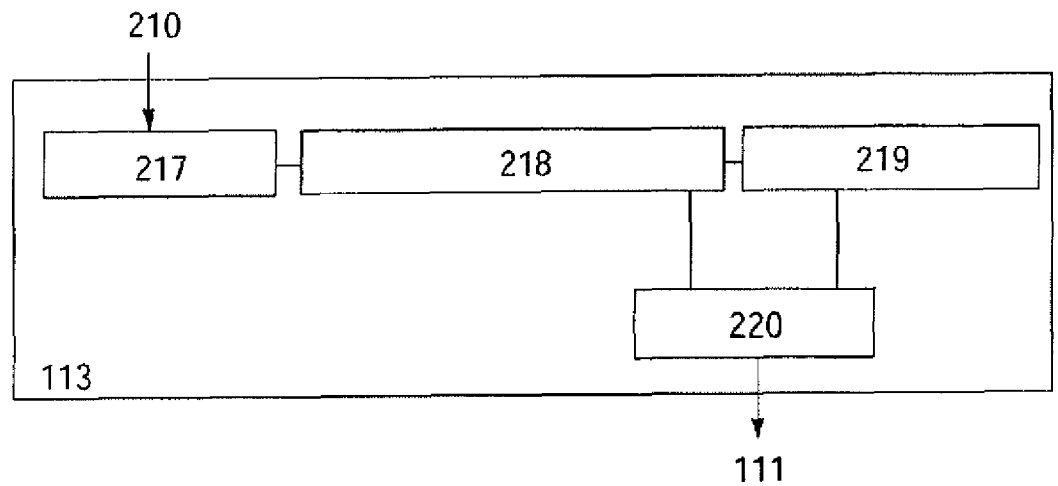

Next, the power storage portion 113 is described with reference to FIG. 2B. The power storage portion 113 can wirelessly supply power, and includes a rectifier circuit 217, a current/voltage control circuit 218, a charge control circuit 219, and a battery 220.

Induced electromotive force generated in the antenna is supplied to the rectifier circuit 217 through the resonant circuit 210 and rectified as direct-current power. Then, the output voltage is applied to the current/voltage control circuit 218 and adjusted to voltage appropriate for charging, and thereafter, applied to the battery 220; thus, the battery 220 is charged wirelessly. The charge control circuit 219 monitors a charging condition of the battery and controls power supplied from the current/voltage control circuit 218 to the battery 220. Specifically, the charge control circuit 219 adjusts the rectified power to a given voltage value or current value appropriate for charging. When charging of the battery 220 is completed, power supply from the current/voltage control circuit 218 to the battery 220 is finished. The battery 220 functions as a power source for driving each circuit included in the individual management device 101 by using stored power.

The rectifier circuit 217 converts alternating current into direct current by using any of a half-wave rectifier circuit, a full-wave rectifier circuit, a bridge rectifier circuit, and a half-wave voltage doubler rectifier circuit, and smoothes voltage by large capacitance. The aforementioned rectified circuits include a diode. Alternatively, the aforementioned rectified circuits may include a diode-connected TFT.

The individual management device 101 having the above-described structure is attached to a managed object after the registration operation (or is attached to a managed object and the registration operation is performed, and thereafter), and communicates with the individual information management device 103. The individual identification device 102 demands information from the individual management device 101 and receives identification information sent back from the individual management device 101. Then, the individual identification device 102 transmits the received identification information to the individual information management device 103. The individual identification device 102 includes a wireless communication portion 121 for wirelessly communicating with the individual management device 101, a storage portion 122 for temporarily storing identification information or the like received from the individual management device 101, and a circuit communication portion 124 for communicating with the individual information management device 103 through the communication line 104. Since the individual identification device 102 communicates with the individual management device 101 and performs wire communication with the individual information management device 103, the individual identification device 102 also includes an information processing portion 123 for processing information exchanged by communication into an appropriate form. Note that the wireless communication portion 121 may have a similar structure to that of the wireless communication portion 111 which is already described.

Note that in this embodiment mode, the individual identification device 102 includes the circuit communication portion 124 because the individual identification device 102 communicates with the individual information management device 103 through the communication line 104; however, the individual identification device 102 and the individual information management device 103 may wirelessly communicate with each other. In this case, instead of the circuit communication portion 124 and a circuit communication portion 131, the individual identification device 102 may include a wireless communication portion for wirelessly communicating with the individual information management device 103, and the individual information management device 103 may include a wireless communication portion for wirelessly communicating with the individual identification device 102. When the individual identification device 102 and the individual information management device 103 wirelessly communicate with each other, the individual identification device 102 preferably includes a power storage portion 126. The power storage portion 126 may have a similar structure to that of the power storage portion 113 and can be charged wirelessly, or may be connected by a wire to an external power supply so that power is supplied to the power storage portion 126.

In addition, the individual identification device 102 includes a notice-to-user portion 125 in order to inform the user of a communication situation with the individual management device 101. The notice-to-user portion 125 may be, for example, a display portion, a lighting element, a vibrator, a sound device, a voice notification device and the like.

Further, the individual identification device 102 includes a position analysis portion 128 in order to identify a position of the individual management device 101.

The individual identification device 102 may also include an imaging portion 127, for example, a camera for taking an image of a managed object in order to correlate the managed object to be registered with identification information included in the individual management device 101 attached to the managed object.

The individual information management device 103 stores individual information corresponding to all managed objects registered by the user. The user attaches the individual management device 101 to the managed object, and thereafter, inputs individual information such as a name of the managed object to the individual information management device 103. Then, the individual information management device 103 reads identification information stored in the individual management device 101 through the individual identification device 102, correlates information on the name or the like of the managed object registered by the user with the identification information, and stores the information as individual information. The individual information management device 103 includes the circuit communication portion 131 for communicating with the individual identification device 102; and an information processing portion 132 for processing information input by the user and information for communicating with the individual identification device 102. Further, the individual information management device 103 includes a storage portion 133 for storing registered individual information and a program file for operating this system in the registration operation or in the usage, and an information input/output portion 134 for receiving information input by the user or displaying individual information.

Figure 3A:
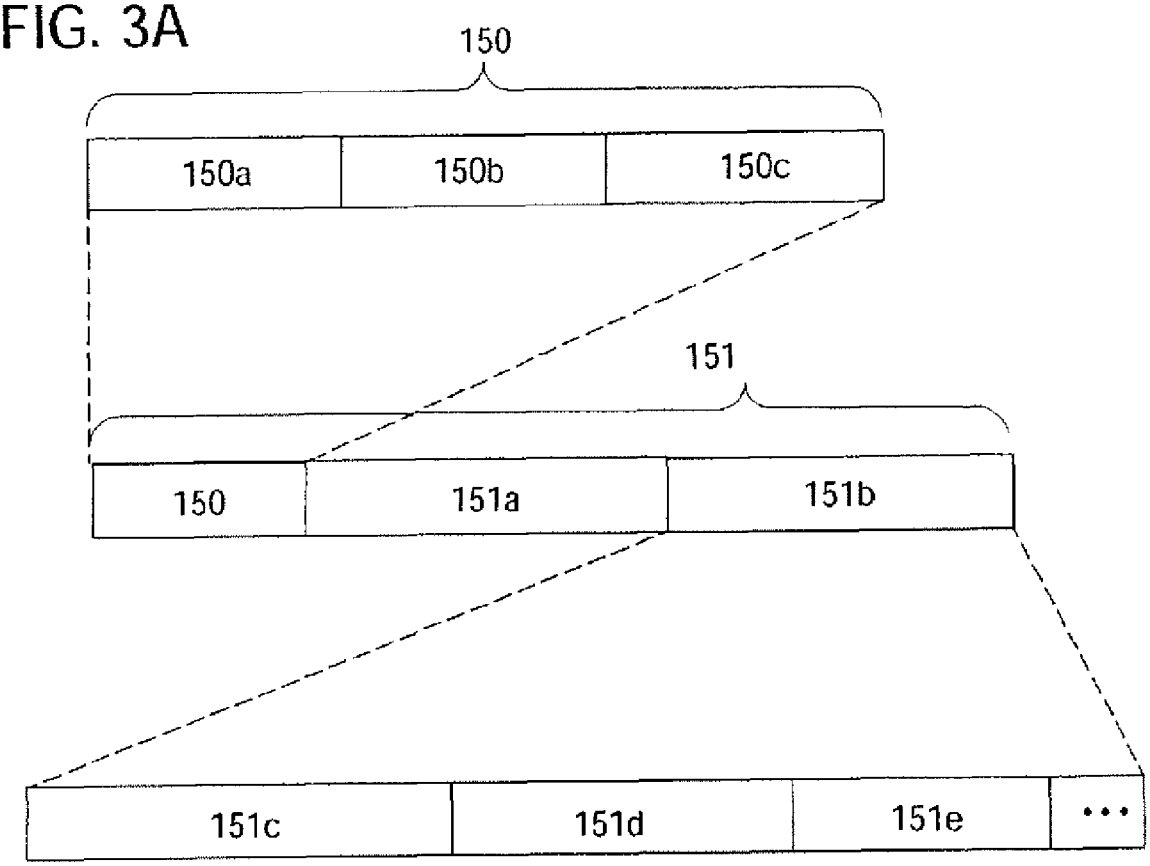
FIGS. 3A and 3B each illustrate a system of the invention.
Figure 3B:
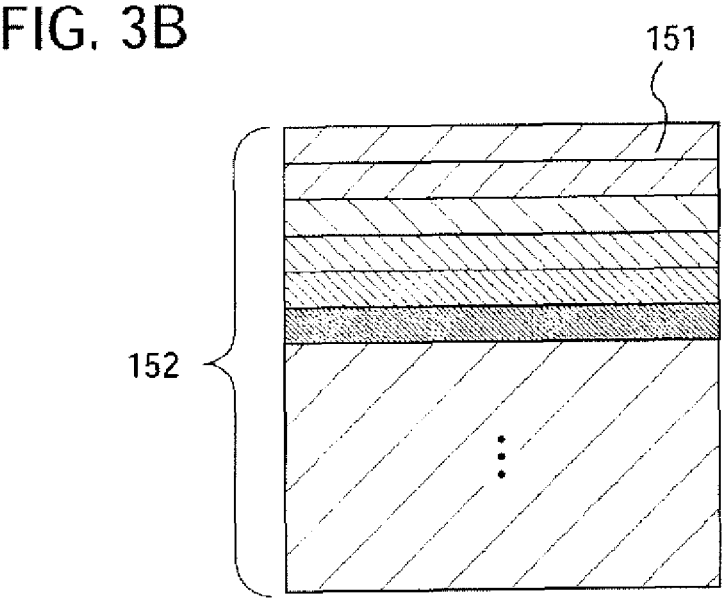

Identification information 150 stored in the individual management device 101 and individual information 151 stored in the individual information management device 103 are described with reference to FIGS. 3A and 3B. The identification information 150 is for specifying one managed object among a plurality of managed objects. The identification information 150 includes at least a management number 150*a* allocated to each managed object, a system number 150*b* for preventing confusion when a plurality of similar systems exist in the area, and a user number 150*c* (see FIG. 3A).

The individual information 151 includes the identification information 150 stored in the individual management device 101, a name or the like 151*a* of the managed object, and other information 151*b*. Examples of the other information 151*b* include managed object image data 151*c* for improving convenience, a system password 151*d* used in operating the system, and a registration operation record 151*e*. The storage portion 133 of the individual information management device 103 stores the individual information 151 related to all the registered individual management devices 101 as a database 152 (see FIG. 3B).

Note that the individual management device 101 may store the individual information 151 instead of the identification information 150. However, the individual management device 101 is preferably small since it is attached to the managed object. Accordingly, it is preferable for the individual management device 101 to store only minimum information so that storage capacity is kept as small as possible.

Next, the time of usage of the individual management system of the invention is described.

The identification information 150 which is unique to the individual management device 101 is stored in the individual management device 101. Then, similar to the time of the registration operation, when the individual management device 101 receives a demand for information from the individual identification device 102, the individual management device 101 transmits the identification information 150 to the individual identification device 102.

The detection portion 114 included in the individual management device 101 is described. The detection portion 114 corresponds to an element that detects surroundings of the individual management device 101, such as a temperature sensor, an optical sensor (preferably an optical sensor that can distinguish surrounding colors), a humidity sensor, an acceleration sensor, an angular velocity sensor, or a magnetic sensor (preferably a magnetic sensor that can detect the earth magnetism). When the individual management device 101 includes an optical sensor as the detection portion 114, the degree of brightness of a place where the individual management device 101 exists can be detected, and information for specifying the place of the managed object whose location is desired to be identified can be obtained. Further, when the individual management device 101 includes plural kinds of sensors or the like, a plurality of pieces of information for specifying the place of the managed object can be obtained, and a position of the managed object can be identified more accurately.

Figure 4A:
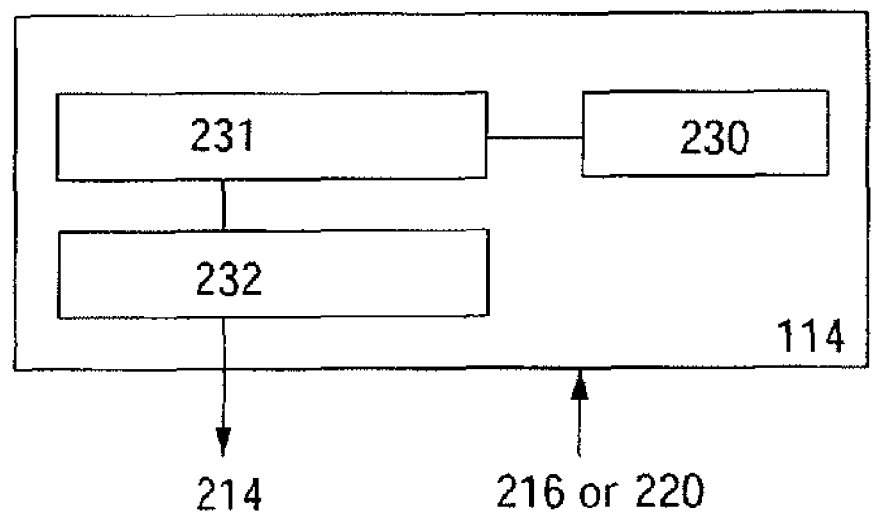
FIGS. 4A and 4B each illustrate a system of the invention.

An example of a structure of the detection portion 114 included in the individual management device 101 is described with reference to FIG. 4A. The detection portion 114 includes a sensor 230 such as an optical sensor, a temperature sensor, or a humidity sensor; an A/D converter circuit 231 for converting an analog signal output from the sensor into a digital signal; and an information processing circuit 232 for processing a digital signal. In such a manner, information which is detected by the detection portion 114 and processed by the information processing circuit 232 is input to the encoding circuit 214, modulated by the modulation circuit 212 included in the wireless communication portion 111, and transmitted to the individual identification device 102 through the antenna included in the resonant circuit 210. In order to secure driving power of the detection portion 114, the power supply circuit 216 included in the wireless communication portion 111 or the battery 220 included in the power storage portion 113 is used.

The individual identification device 102 receives a command from the individual information management device 103 and selects one individual management device from a plurality of individual management devices to perform communication. Specifically, the individual identification device 102 wirelessly communicates with the individual management device 101 having identification information designated by the individual information management device 103.

The information processing portion 123 has a function of processing information for communication and a function of analyzing a distance between the individual identification device 102 and the specific individual management device 101 which communicates with the individual identification device 102 and a direction in which the individual management device 101 exists based on the individual identification device 102. Then, a position of the individual management device 101 analyzed by the information processing portion 123, information detected by the detection portion 114 included in the individual management device 101, or the like can be transmitted to the user from the notice-to-user portion 125 in the individual identification device 102.

The function of analyzing a distance between the individual identification device 102 and the specific individual management device which communicates with the individual identification device 102 and a direction in which the individual management device exists is described. First, the case of analyzing only a distance is described.

By wireless communication between the individual management device 101 and the individual identification device 102, a distance between the individual management device 101 and the individual identification device 102 and a direction in which the individual management device 101 exists based on the individual identification device 102 can be measured.

For example, by using the level of induced electromotive voltage which is generated in the antenna included in the wireless communication portion 121 of the individual identification device 102 due to an electromagnetic wave emitted from the individual management device 101, the individual identification device 102 can detect the distance between the individual management device 101 and the individual identification device 102. This is because, when the individual management device 101 transmits an electromagnetic wave with predetermined power, the distance between the individual management device 101 and the individual identification device 102 depends on the level of the induced electromotive voltage which is generated in the antenna of the individual identification device 102. Accordingly, from the level of the induced electromotive voltage which is generated in the antenna of the individual identification device 102 by transmission of an electromagnetic wave with predetermined power from the wireless communication portion 111 included in the individual management device 101, the distance between the individual management device 101 and the individual identification device 102 can be obtained.

Figure 4B:
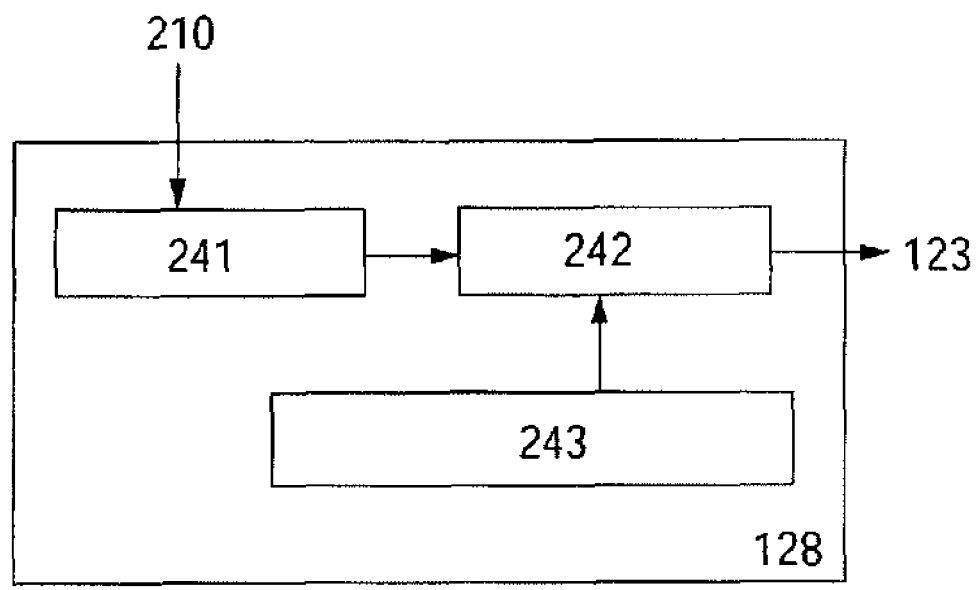

The position analysis portion 128 included in the individual identification device 102 in this case is described with reference to FIG. 4B. The position analysis portion 128 includes a rectifier circuit 241, a comparison circuit 242, and a comparison potential generation circuit 243.

The rectifier circuit 241 rectifies induced electromotive voltage generated by receiving an electromagnetic wave from the individual management device 101, and inputs an output signal to the comparison circuit 242. The comparison potential generation circuit 243 generates a reference potential for being compared with a potential of the output signal of the rectifier circuit 241, and inputs the reference potential to the comparison circuit 242. The comparison circuit 242 compares a potential of the signal input from the rectifier circuit 241 and the reference potential The comparison result is input to the information processing portion 123 included in the individual identification device 102. Then, the information processing portion 123 performs operation and calculates a distance. The calculated result is transmitted to the notice-to-user portion 125. The information processing portion 123 which processes output information of the comparison circuit preferably includes a circuit that can perform logical operation, specifically, a central processing unit (CPU), for example.

The distance between the individual management device 101 and the individual identification device 102 is not necessarily proportional to the level of induced electromotive voltage generated in the antenna of the individual identification device 102. Therefore, in the case where the more accurate distance needs to be obtained, the level of the induced electromotive voltage generated in the antenna of the individual identification device 102 when the individual management device 101 transmits an electromagnetic wave with given power (referred to as first power) and the level of the induced electromotive voltage when the individual management device 101 transmits an electromagnetic wave with power that is different from the first power (referred to as second power) are compared, and the distance is obtained from the comparison result. In this case, the individual management device 101 includes a current/voltage control circuit for generating the first power and the second power and applying them to the antenna. The current/voltage control circuit has a similar structure to that of the current/voltage control circuit 218 described in FIG. 2B.

Figure 5:
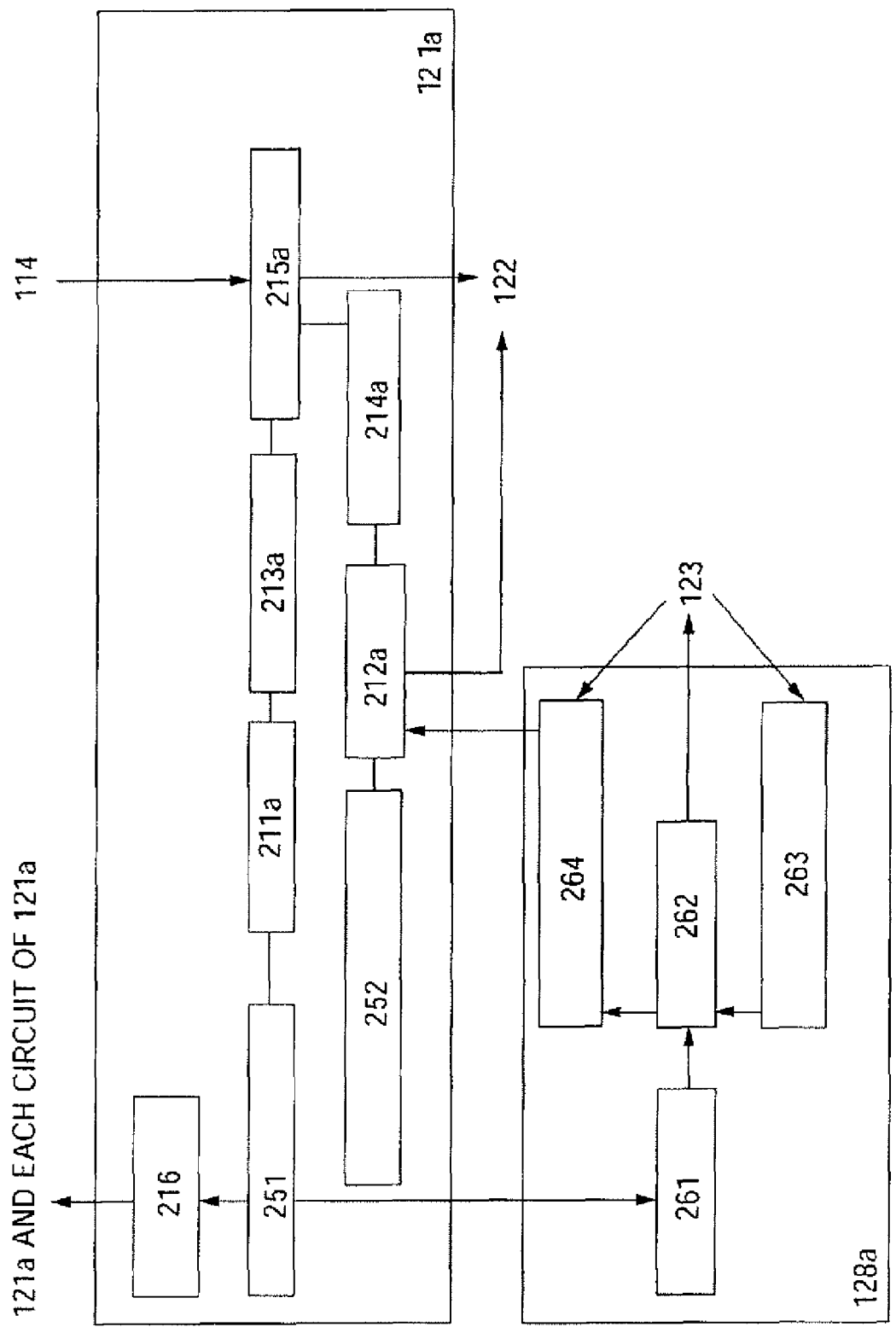
FIG. 5 illustrates a system of the invention.

Next, with reference to FIG. 5, the case is described in which the individual identification device 102 has a structure capable of analyzing not only the distance between the individual management device 101 and the individual identification device 102 but also the direction in which the individual management device 101 exists. In this case, the wireless communication portion 121 shown in FIG. 1 is replaced by a wireless communication portion 121a, and the position analysis portion 128 is replaced by a position analysis portion 128a. In order to detect which direction the individual management device 101 exists based on the individual identification device 102, an antenna for reception should be provided in the wireless communication portion of the individual identification device 102, and the antenna for reception should have directivity. When the antenna for reception has directivity, a direction of the largest induced electromotive force when the antenna is pointed in various directions can be specified as the direction in which the individual management device 101 exists.

FIG. 5 shows the wireless communication portion 121a and the position analysis portion 128a. The wireless communication portion 121a includes an antenna 251 for reception and a directional antenna 252 for transmission. A transmission direction of the directional antenna 252 for transmission can be preferably changed The other circuits included in the wireless communication portion 121a have similar structures to those of the wireless communication portion 121. The position analysis portion 128a compares the levels of powers of received electromagnetic waves. The position analysis portion 128a includes a rectifier circuit 261, a comparison circuit 262, a comparison potential generation circuit 263, and a communication power control circuit 264. The rectifier circuit 261, the comparison circuit 262, and the comparison potential generation circuit 263 have similar structures to those of the rectifier circuit 241, the comparison circuit 242, and the comparison potential generation circuit 243, respectively. The comparison result is input to the information processing portion 123. The information processing portion 123 controls power which is supplied to the directional antenna 252 for transmission through the communication power control circuit 264.

A method where the individual identification device 102 including the wireless communication portion 121a and the position analysis portion 128a detects the direction in which the individual management device 101 exists is described with reference to FIG. 6. First processing starts (Step 300). The individual identification device 102 communicates with the individual management device 101 at an angle θ (Step 301). It is determined whether or not a reply is sent from the individual management device 101 (step 302). When a reply is sent from the individual management device 101, the individual identification device 102 stores the fact that a reply is sent at the angle θ (Step 304). When a reply is not sent from the individual management device 101, power is increased (Step 303), and the individual identification device 102 communicates with the individual management device 101 again. When a reply is not sent even with the maximum power in the possible output range, the individual identification device 102 stores the fact that a reply is not sent at that angle. Next, the individual identification device 102 changes the angle θ in the possible range and communicates with the individual management device 101, and the processing is performed again from Step 301 (Step 305). From the stored result, the individual identification device 102 displays a direction from which the reply is sent or a direction of the maximum intensity of the received power as the direction in which the individual management device 101 exists (Step 306). Then, the processing ends (Step 307).

Next, a method where the individual identification device 102, including the wireless communication portion 121a and the position analysis portion 128a, detects the direction of the individual management device 101 and a distance between the individual identification device 102 and the individual management device 101, from which a position of the individual management device 101 can be determined is described with reference to FIG. 7. First, processing starts (Step 400). The individual identification device 102 communicates with the individual management device 101 with certain power $P_1$ (Step 401). When a reply is sent from the individual management device 101 (Step 402), the individual identification device 102 reduces power (Step 403A) and communicates with the individual management device 101, and gradually reduces power until the individual management device 101 does not send a reply to the individual identification device 102 (Step 404A). Here, the individual identification device 102 stores power $P_2$ with which communication can be performed for the last time (Step 405A). In Step 402, when a reply is not sent from the individual management device 101, the individual identification device 102 increases power (Step 403B) and communicates with the individual management device 101, and gradually increases power until the individual management device 101 sends a reply to the individual identification device 102 (Step 404B). Here, the individual identification device 102 stores power $P_3$ with which communication can be performed for the first time (Step 405B). When the individual management device 101 and the individual identification device 102 wirelessly communicate with a radio wave, the radio wave emitted with specific power P attenuates inversely proportional to the square of the distance between the individual management device 101 and the individual identification device 102. Accordingly, larger power is needed as the distance between the individual management device 101 and the individual identification device 102 is larger, and Step 403B to Step 405B are performed. On the other hand, power can be smaller as the distance between the individual management device 101 and the individual identification device 102 is reduced, and Step 403A to Step 405A are performed. Thus, when the individual identification device 102 is fixed at a certain distance, a relation of powers emitted from the individual identification device 102 satisfies $P_2<P_1<P_3$. Accordingly, the individual identification device 102 should have a structure capable of communication with a power of $P_2$ to $P_3$. Preferably, the individual identification device 102 has a structure where communication can be performed with power capable of communication in the largest distance in the range of use of this system.

Then, the individual identification device 102 is pointed in the direction of the angle θ by using the directional antenna 252 for transmission, and communicates with the individual management device 101 with the power $P_2$ or the power $P_3$. When a reply is sent from the individual management device 101, the individual identification device 102 stores the power P, changes the angle, and communicates with the individual management device 101 in the same manner (Step 406). The angle is changed as much as possible. From these results, the individual identification device 102 determines that a direction capable of communicating with the individual management device 101 or a direction of the largest power sent back from the individual management device 101 is the direction in which the individual management device 101 exists and displays the direction (Step 407). Then, the processing ends (Step 408).

Alternatively, the position analysis portion included in the individual identification device 102 may include a plurality of antennas and a delay adding circuit, instead of the directional antenna. In this case, the position analysis portion includes a plurality of antennas arranged in a specific way, preferably in one column, in matrix, or the like. Alternating-current power generated in each of the plurality of antennas is input to the delay adding circuit, and delay addition is performed; thus, the direction in which the individual management device 101 exists can be calculated. The calculation is performed by using variation in phases of induced electromotive forces generated in each of the plurality of antennas provided in the individual identification device 102 due to variation in distances between each antenna and an emission source (in this embodiment mode, the individual management device 101). Then, powers of different phases are delayed for distances between each of the antennas and added; thus, the solution with the maximum value in a direction of the emission source can be obtained.

Figure 6:
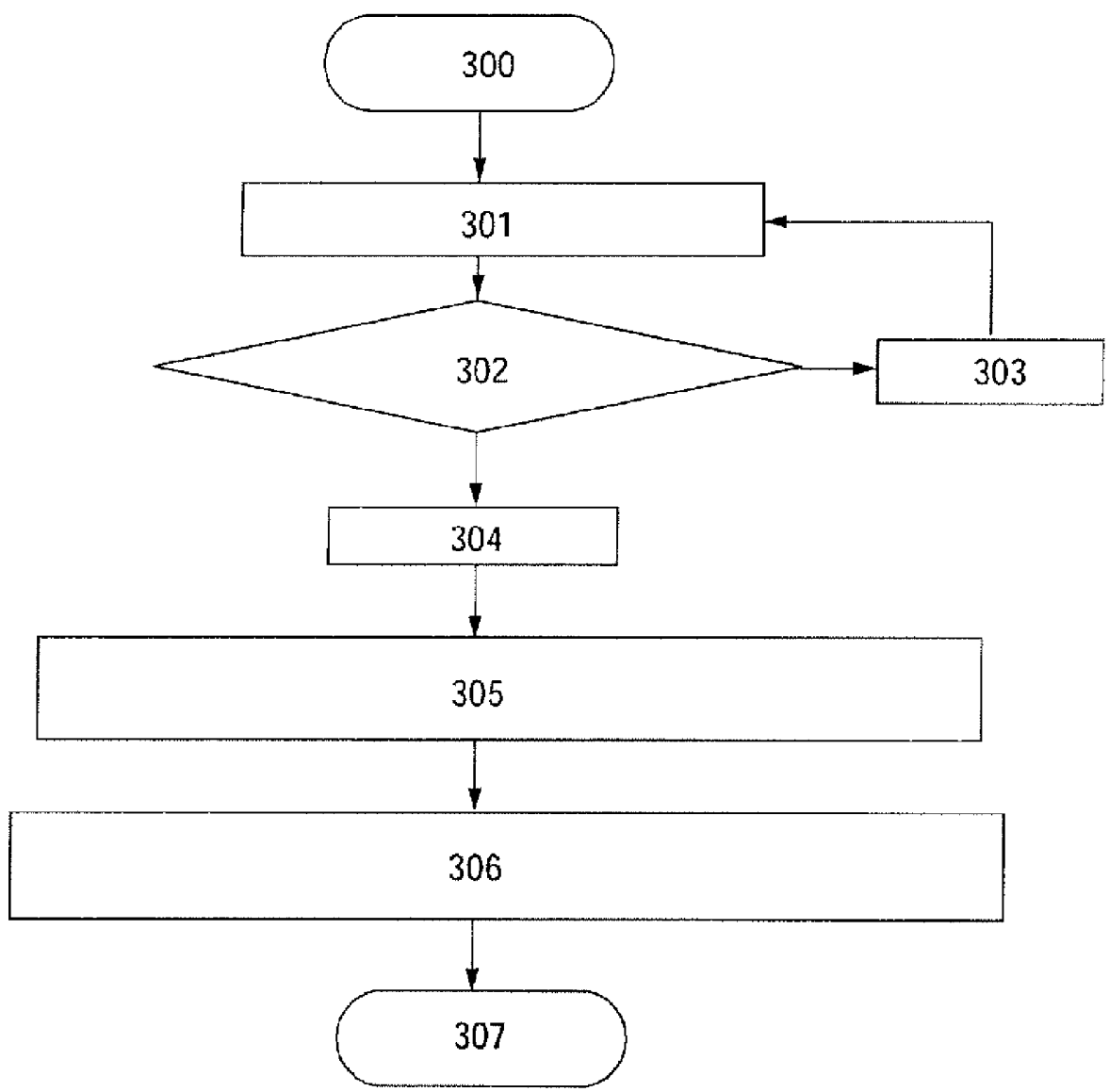
FIG. 6 illustrates a system of the invention.
Figure 7:
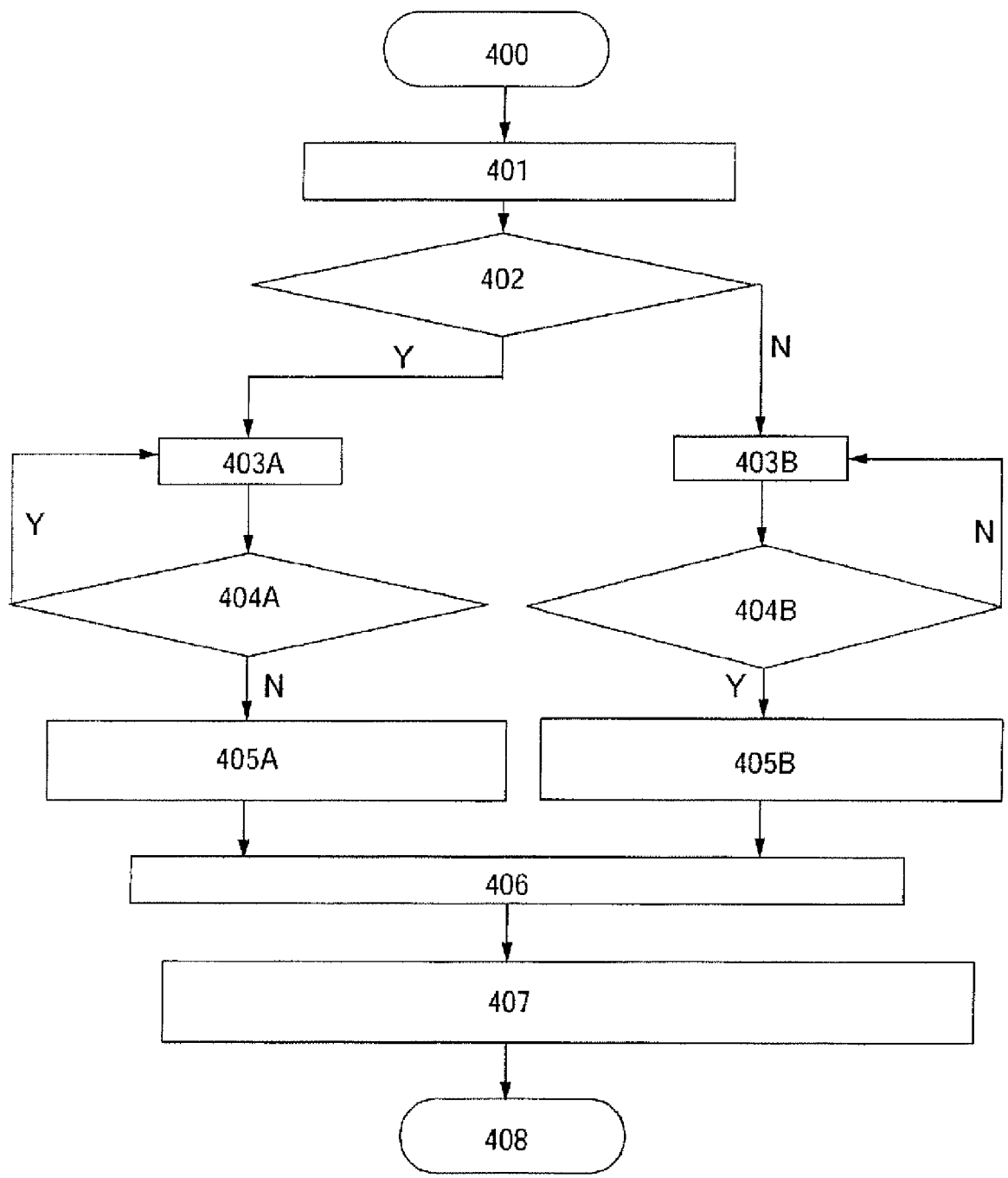
FIG. 7 illustrates a system of the invention.

In addition, when the individual management system of the invention is used in a room, it is assumed that the system cannot be effectively used by the methods described in FIGS. 6 and 7 in some cases due to a reflected wave from a wall surface or the like. In such a case, induced electromotive voltage generated in the antenna of the individual identification device 102 may be used, similarly to the case of the distance. For example, induced electromotive voltage generated in the antenna of the individual identification device 102 when the individual identification device 102 is in a position A is stored. Then, the individual identification device 102 moves to a position B, and induced electromotive voltage of the individual identification device 102 in the position B is compared with the induced electromotive voltage in the position A. When the induced electromotive voltage in the position B is smaller than that in the position A, it can be determined that the individual management device 101 is closer to the position A than to the position B.

By repeating comparison of the induced electromotive voltages in such a manner, the direction in which the individual management device 101 exists can be almost clarified. At this time, by knowing the movement of the individual identification device 102, the direction in which the individual management device 101 exists can be known more accurately. In order to realize such a function, the individual identification device 102 should include an acceleration sensor, an angular velocity sensor, or the like for detecting the movement of the individual identification device 102. Furthermore, a layout of the room may be displayed, for example, on the notice-to-user portion 125 when used as a display portion, so that the user may easily view a position of the individual management device 101 in relation to a position of the individual identification device 102.

Further, when the user uses this system, it is difficult to secure power if the individual identification device 102 and the individual information management device 103 are not connected by the communication line. Accordingly, the individual identification device 102 may include the power storage portion 126 as a power source for driving the individual identification device 102 itself. The power storage portion 126 has a similar structure to that of the power storage portion 113.

The individual information management device 103 stores individual information corresponding to all the registered managed objects. When the user selects a managed object whose position is desired to be identified, the individual information management device 103 transmits identification information or the like included in the individual management device 101 attached to the designated managed object to the individual identification device 102 through the communication line 104.

As described above, according to the invention, an accurate position of the managed object can be identified, and the managed object can be managed accurately.

Embodiment Mode 2

In this embodiment mode, the individual management device 101 having a structure different from that in Embodiment Mode 1 is described. As described in Embodiment Mode 1, the individual management device 101 stores identification information and wirelessly communicates with the individual identification device 102. In Embodiment Mode 1, the case is described in which the individual management device 101 stores specific identification information in advance. Alternatively, in the individual management system of the invention, the individual management device 101 can have a structure where it does not store specific identification information in advance.

When the individual management device 101 does not store specific identification information in advance, the individual management device 101 should store specific identification information registered in the individual information management device 103 by wireless communication from the individual identification device 102.

A registration operation in the case where the individual management device 101 does not store specific identification information in advance is described. In the registration operation, the individual management device 101 communicates with the individual identification device 102 by the wireless communication portion 111 through an electromagnetic wave. At this time, the wireless communication portion 111 receives specific identification information from the individual identification device 102 and makes the storage portion 112 store the identification information.

The storage portion 112 includes a writable storage circuit, preferably a writable nonvolatile memory, and more preferably a write-once nonvolatile memory. When the write-once nonvolatile memory is used in the storage portion 112, improper rewriting can be prevented, and reliability of the system can be improved.

When unique identification information is not stored in the individual management device 101 as in this embodiment mode, identification information transmitted from the individual identification device 102 is written to the storage portion 112. Since high voltage is generally needed to write information to the storage portion, the individual management device 101 preferably includes the power storage portion 113 described in Embodiment Mode 1. The structure of the power storage portion 113 is as described in Embodiment Mode 1. The power storage portion may also include a circuit that generates high voltage or low voltage, such as a boosting circuit or a voltage step-down circuit.

In addition, when unique identification information is not stored in the individual management device 101 in advance, functions of the individual identification device 102 and the individual information management device 103 are slightly different from those in Embodiment Mode 1.

For example, in the registration operation, the individual identification device 102 receives specific identification information from the individual information management device 103 through the communication line 104. Then, the individual identification device 102 wirelessly communicates with the individual management device 101 and makes the individual management device 101 store the identification information. Therefore, in the registration operation, the individual information management device 103 has to determine identification information to be stored in the individual management device 101. That is, the individual information management device 103 has to determine the identification information 150 (especially the management number 150a shown in FIG. 3A) so that pieces of identification information issued corresponding to the individual management devices 101 attached to the respective managed objects are different from each other. Such an operation can be performed by the information processing portion 132 included in the individual information management device 103. Furthermore, it is possible that the individual information management device 103 is provided in the individual identification device 102 instead of externally from the individual identification device 102.

Therefore, the registration operation in the case where the individual management device 101 does not store unique identification information is as follows.

First, the user inputs information on a managed object to which the individual management device 101 is attached to the individual information management device 103. Next, the individual information management device 103 issues the identification information 150 to be written to the individual management device 101 and transmits the identification information 150 to the individual identification device 102. The individual identification device 102 transmits the received identification information 150 to the individual management device 101. The individual management device 101 stores the identification information 150 in the storage portion 112. At the same time, the individual information management device 103 correlates the information on the managed object which is input by the user with the identification information 150 issued corresponding to the individual management devices 101, and stores the information in the storage portion 133 as the individual information 151.

With the above-described structure, even when the individual management device 101 does not store unique identification information, the individual management system can be realized by giving specific identification information to the individual management device 101.

The individual management system described in this embodiment mode is particularly effective in the case where a managed object is added and the individual management device 101 needs to be added, for example. That is, when the number of managed objects is larger than the number of the individual management devices 101 that the user initially has, is additionally registered, only the number of the individual management devices 101 has to be increased, which is difficult for the method described in Embodiment Mode 1. Accordingly, when the individual management system has the structure shown in this embodiment mode, the identification information to 150 included in the individual management device 101 which is initially set and identification information included in the additional individual management device 101 can be different from each other; thus, danger that the same identification information is issued for a different individual management devices 101 and the system is confused can be avoided.

In addition, the method in this embodiment mode is also extremely effective in the case where a managed object is renewed. For example, when a managed object is a bicycle key and the user buys a new bicycle, the key is replaced by a new key. In this case, the individual management device 101 attached to the old bicycle key can be reattached to the new bicycle key. Alternatively, the new individual management device 101 can be obtained and attached to the new key.

Embodiment 1

A device for realizing the invention, which is described in Embodiment Modes 1 and 2, includes a transistor. For the transistor, a thin film transistor can be used, for example. Further, a thin film transistor may be formed over a glass substrate. In this embodiment, an example of a manufacturing method of a thin film transistor that is formed by deposition of silicon over a glass substrate is described with reference to FIGS. 8A to 8C. Further, in accordance with an application of a semiconductor device, a semiconductor element formed over a glass substrate can be separated and attached to a flexible substrate. This step is described with reference to FIGS. 9A to 9C.

First, a separation layer 802 is formed over a glass substrate 801. Although a quartz substrate, a silicon substrate, a metal substrate, or the like can be used other than a glass substrate, the glass substrate is used in this embodiment. The separation layer 802 is formed of an element or a compound of metal, silicon, or the like over the entire surface or a part of the surface of the substrate. Note that when the step in which a semiconductor element is separated and attached to a flexible substrate is not performed, the separation layer 802 is not necessarily formed.

Next, an insulating layer 803 is formed so as to cover the separation layer 802. The insulating layer 803 is preferably formed of silicon oxide, silicon nitride, or the like by a CVD method or a sputtering method. Then, a semiconductor film to be a semiconductor layer 804 is formed over the insulating layer 803, and hydrogen remaining in the semiconductor layer 804 is removed by heat treatment at approximately 500° C. Note that the semiconductor film is formed by a CVD method using a silane gas, for example. Then, the semiconductor film is crystallized. Crystallization of the semiconductor film is performed by a laser crystallization method or a thermal crystallization method using a metal catalyst, for example. Then, the crystallized semiconductor film is patterned into a desired shape; thus, the semiconductor layer 804 is formed. Next, a gate insulating layer 805 is formed so as to cover the semiconductor layer. The gate insulating layer 805 is formed of silicon oxide, silicon nitride, or the like, similarly to the insulating layer 803.

Figure 8A:
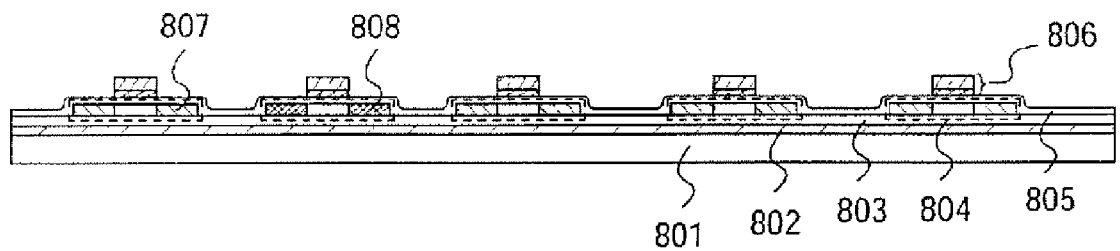
FIGS. 8A to 8C illustrate a method for manufacturing a device included in a system of the invention.

Next, a gate electrode layer 806 is formed. A conductive layer is formed of an element or a compound having conductivity and patterned into a desired shape; thus, the gate electrode layer 806 is formed. When patterning is performed by a photolithography method and a resist mask is etched by plasma or the like, the gate electrode width is reduced, and performance of the transistor can be improved. FIG. 8A shows the case where the gate electrode layer 806 has a stacked-layer structure.

Next, an impurity is added to the semiconductor layer 804; thus, an n-type impurity region 807 and a p-type impurity region 808 are formed. A resist mask is formed by a photolithography method, and an impurity element such as phosphorus, arsenic, or boron is added; thus, the impurity region is formed (see FIG. 8A).

Figure 8B:
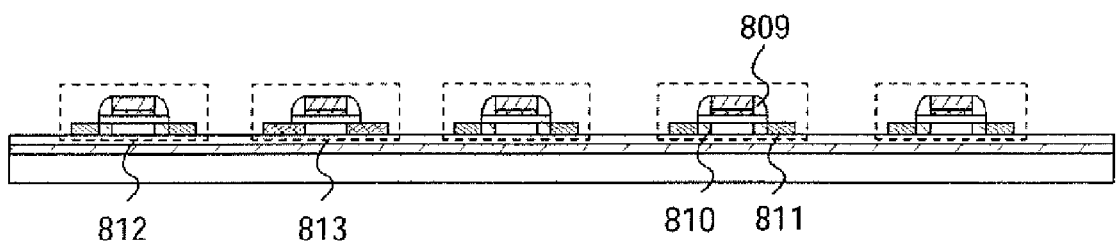

Next, an insulating film is formed of silicon nitride or the like and anisotropically etched perpendicular to the substrate; thus, an insulating layer 809 is formed as a sidewall which is in contact with a side surface of the gate electrode layer 806 (see FIG. 8B).

Next, an impurity element is further added to the semiconductor layer 804 including the n-type impurity region; thus, a first n-type impurity region 810 located under the insulating layer 809 and a second n-type impurity region 811 having higher impurity concentration than the first impurity region are formed. As described above, an n-channel transistor 812 and a p-channel transistor 813 are formed.

Figure 8C:
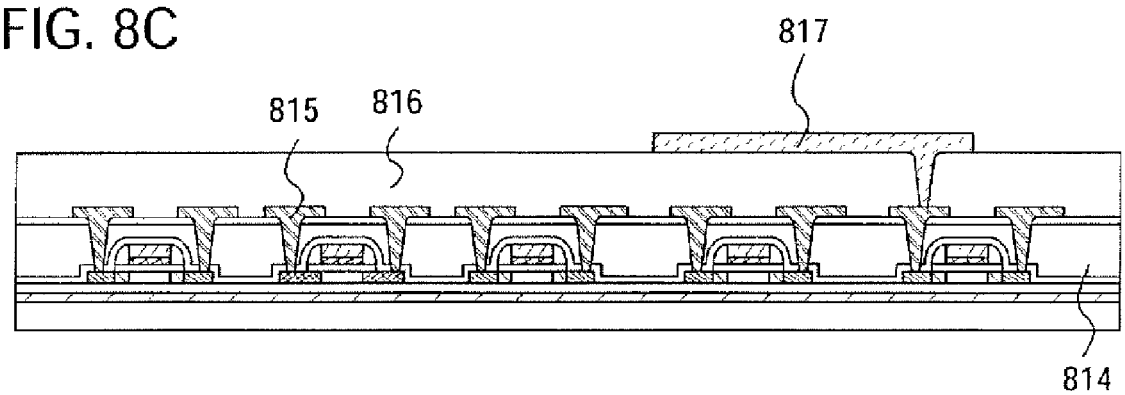

Then, an insulating layer 814 is formed and covers the n-channel transistor 812 and the p-channel transistor 813. The insulating layer 814 is formed of an organic compound or an inorganic compound having an insulating property, or the like. FIG. 8C shows the case where the insulating layer 814 has a stacked-layer structure. Thereafter, a contact hole by which the second n-type impurity region 811 and the p-type impurity region 808 are exposed is formed. Then, a conductive layer 815 is formed so as to connect to the second n-type impurity region 811 and the p-type impurity region 808 through the contact hole and to have a desired pattern. The conductive layer 815 is formed of a metal element or a compound having conductivity, or the like.

Next, an insulating layer 816 is formed so as to cover the conductive layer 815. The insulating layer 816 is formed of an inorganic compound or an organic compound having an insulating property, or the like. The insulating layer 816 is formed to have a single-layer structure or a stacked-layer structure of an inorganic material or an organic material by a spin on glass (SOG) method, a droplet discharging method, a sputtering method, a CVD method, or the like. The insulating layer 816 is preferably formed to a thickness of 0.75 to 3 μm.

Note that each layer (e.g., the insulating layer or the conductive layer) included in the semiconductor element as described above may be formed with a single-layer structure of a film made of a single material or a stacked-layer structure of films made of a plurality of materials even if its structure is not particularly specified.

The semiconductor layer included in the semiconductor element can be formed using an amorphous semiconductor, a microcrystalline semiconductor, a polycrystalline semiconductor, an organic semiconductor, or the like.

For example, in order to obtain a semiconductor element with favorable characteristics, a crystalline semiconductor layer (a low-temperature polysilicon layer) obtained by being crystallized at a temperature of 200 to 600° C. (preferably 350 to 500° C.) or a crystalline semiconductor layer (a high-temperature polysilicon layer) obtained by being crystallized at a temperature of 600° C. or more can be used. In order to obtain a semiconductor element with more favorable characteristics, a semiconductor layer obtained by being crystallized with the use of a metal element as a catalyst or a semiconductor layer obtained by being crystallized by a laser irradiation method is preferably used. Alternatively, a semiconductor layer formed using a $SiH_4/F_2$ gas, a $SiH_4/H_2$ gas, or the like by a plasma CVD method or a semiconductor layer obtained by laser irradiation of the semiconductor layer is preferably used.

In addition, a crystalline semiconductor film included in a thin film transistor provided in a device is preferably provided so that a crystal grain boundary is extended in a direction parallel to the direction in which a carrier flows (a channel length direction). Such a crystalline semiconductor layer can be formed by a continuous wave laser or a pulse laser operating at 10 MHz or more (preferably 60 to 100 MHz).

The semiconductor layer 804 has a thickness of 10 to 200 nm, preferably a thickness of 50 to 150 nm. By adding hydrogen or halogen to the semiconductor layer 804, particularly to a channel formation region, at a concentration of $1\times10^{19}$ to $1\times10^{22}$ atoms/cm$^3$, preferably $1\times10^{19}$ to $5\times10^{20}$ atoms/cm$^3$, a semiconductor layer having fewer defects, in which a crack is not easily generated, can be obtained.

The thin film transistor formed as described above has a subthreshold value of 0.35 V/dec or less, preferably 0.09 to 0.25 V/dec. Further, the thin film transistor preferably has a mobility of 10 cm$^2$/Vs or more.

In this embodiment, a thin film transistor (a top-gate thin film transistor) in which a semiconductor layer, a gate insulating layer, and a gate electrode layer are sequentially stacked over a substrate is shown; however, the invention is not limited to such a thin film transistor. A thin film transistor (a bottom-gate thin film transistor) in which a gate electrode layer, a gate insulating layer, and a semiconductor layer are stacked in this order may be employed. Further, an n-channel transistor in this embodiment has a first n-type impurity region and a second n-type impurity region; however, the invention is not limited to such impurity regions, and impurity concentrations of n-type impurity regions may be the same.

In manufacture of a device of the invention, a layer in which a semiconductor element formed through the above-described steps may have a structure where a plurality of films are stacked. When a semiconductor element is formed to have a multilayer structure in such a manner, a low dielectric constant material (a low-k material) is preferably used for a material of an interlayer insulating film in order to reduce parasitic capacitance between layers. Examples of such a low-k material include a resin material such as an epoxy resin and an acrylic resin and a compound material obtained by polymerization of a siloxane polymer or the like. When parasitic capacitance between adjacent wirings in a multilayer wiring structure is reduced, reduction in area, increase in speed of operation, and reduction in power consumption can be realized.

When a protective layer for preventing contamination by an alkali metal is provided, reliability of the device is improved. The protective layer is preferably formed of an inorganic material such as aluminum nitride or silicon nitride to cover a semiconductor element in a circuit or cover the whole circuit.

A semiconductor device of the invention includes an antenna. The antenna can be formed in steps for forming a semiconductor element. In this embodiment, the case where an antenna is formed in the same steps as a semiconductor element is described.

First, a desired portion of the insulating layer 816 in the semiconductor element formed as described above is etched, and a contact hole for exposing the conductive to layer 815 is formed.

Next, a conductive layer 817 which is in contact with the conductive layer 815 and functions as an antenna is formed (see FIG. 8C). The conductive layer 817 is formed using a conductive material having a desired shape by a plasma CVD method, a sputtering method, a printing method, a droplet discharging method, or the like.

The conductive layer 817 is preferably formed to have a single-layer structure or a stacked-layer structure of an element selected from aluminum, titanium, silver, or copper, or an alloy material or a compound material containing the aforementioned element as its main component. In this embodiment, a conductive material is formed using a paste containing silver by a screen printing method, and thereafter, heat treatment at 50 to 350° C. is preformed; thus, the conductive layer 817 is formed. Alternatively, an aluminum layer may be formed by a sputtering method and etched into a desired shape; thus, the conductive layer 817 is formed. When the aluminum layer is patterned, a wet etching method is preferably used, and heat treatment at 200 to 300° C. is preferably preformed after the wet etching processing.

Figure 10:
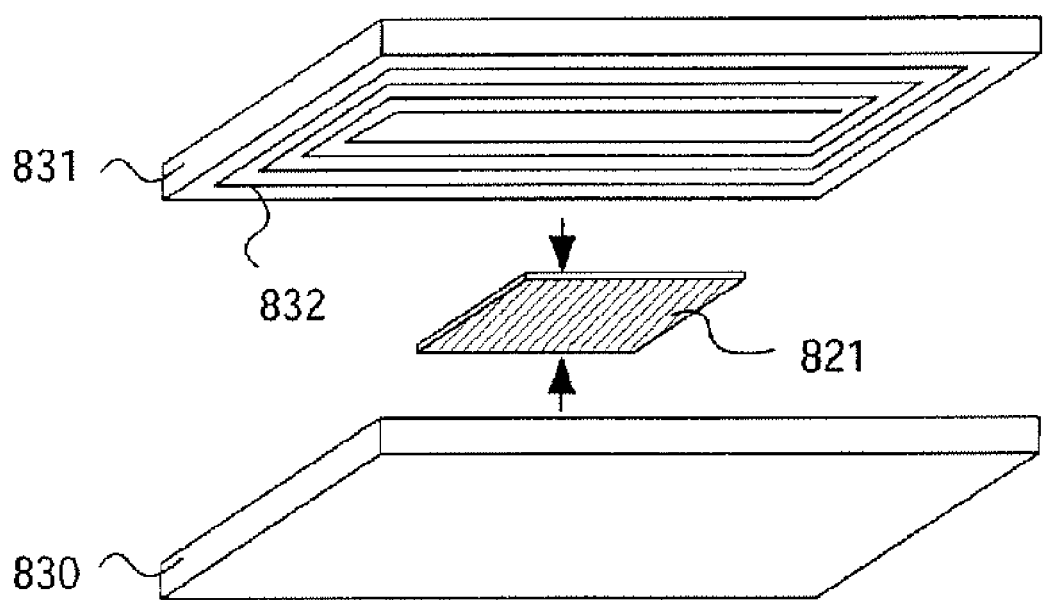
FIG. 10 illustrates a method for manufacturing a device included in a system of the invention.

In addition, an antenna can be formed over another substrate and attached later. For example, in a step in which a semiconductor element is interposed between upper and lower substrates, an antenna 832 can be formed over one substrate and attached so as to electrically connect to the semiconductor element (see FIG. 10C). In this case, the conductive layer 817 in FIG. 8C is formed not as an antenna but as a wiring for connecting to the antenna 832.

In this embodiment, in order to connect the antenna 832 and the conductive layer 817, a bump for connecting to the conductive layer 817 is preferably formed. Further, it is preferable to provide an adhesive layer using anisotropic conductive adhesive between the semiconductor element and the bump.

An anisotropic conductive film and an anisotropic conductive adhesive are materials having conductivity only in the thickness direction (a direction perpendicular to the direction in which objects are attached) and include an adhesive organic resin in which conductive particles with a grain size of several nm to several μm are dispersed. Examples of the organic resin include an epoxy resin and a phenol resin. The conductive particle is formed of one or a plurality of elements selected from gold, silver, copper, palladium, or platinum. Alternatively, a particle having a multilayer structure in which these elements are stacked may be employed. Further alternatively, a conductive particle formed of a resin, a surface of which is coated with a thin film formed of one or a plurality of metals selected from gold, silver, copper, palladium, or platinum may be employed.

Next, a step in which the semiconductor element provided as described above is separated from the glass substrate 801 and attached to a flexible substrate such as a film is described with reference to FIGS. 9A to 9C. When the semiconductor element in which formation of the antenna is completed as described above is separated from the glass substrate 801 and attached to a flexible substrate, the thickness of the semiconductor element is preferably 5 μm or less, more preferably 1 to 3 μm. Further, the area of the semiconductor element included in the device is 25 mm$^2$ or less, preferably 9 to 16 mm$^2$.

Figure 9A:
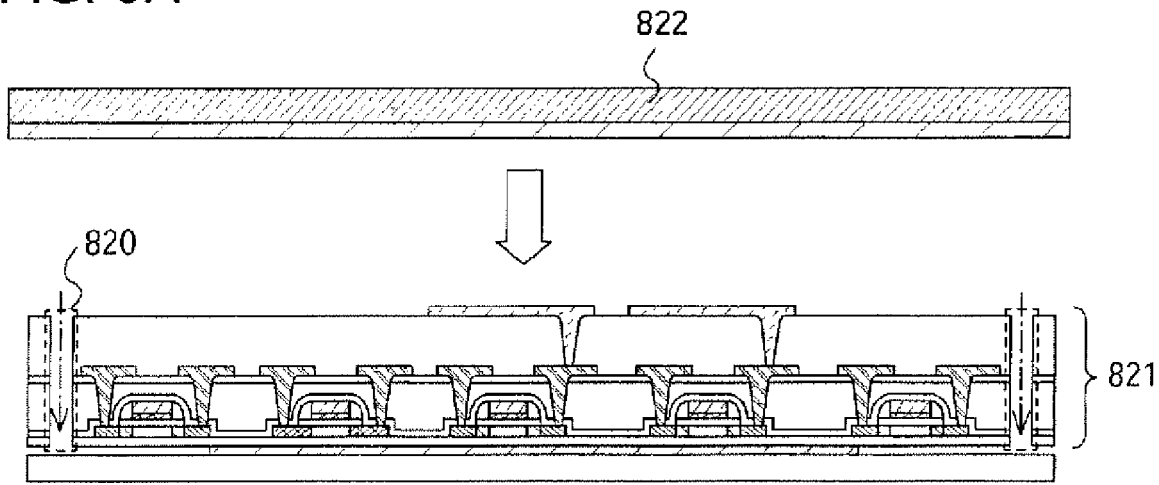
FIGS. 9A to 9C illustrate a method for manufacturing a device included in a system of the invention.

First, as shown in FIG. 9A, an opening portion 820 is formed so that the separation layer 802 is exposed. Then, an etchant is introduced into the opening portion 820, and the separation layer 802 is partially removed.

Figure 9B:
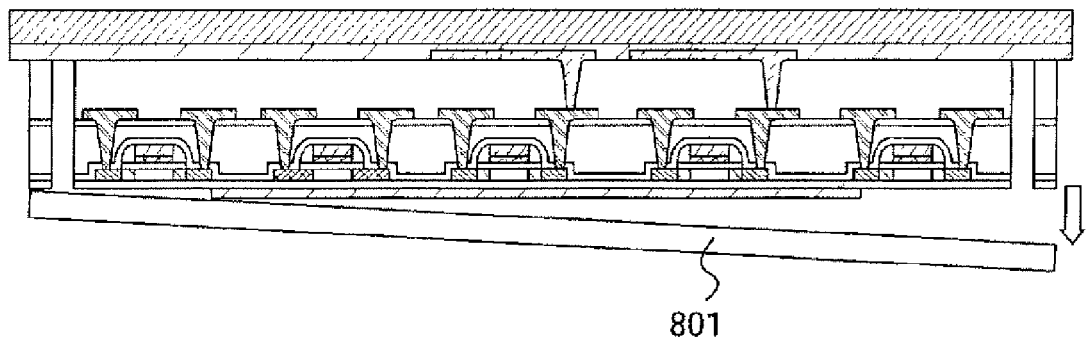

Next, a first flexible substrate 822 adheres to the glass substrate from an upper surface direction of the glass substrate, and a semiconductor element 821 is separated from the glass substrate 801 by separation of the separation layer 802 from the glass substrate 801; thus, the semiconductor element 821 is transferred to the first flexible substrate 822 side (see FIG. 9B).

In this embodiment, as the first flexible substrate 822, a substrate in which a flexible insulating layer and an adhesive layer are stacked can be used. The adhesive layer is a thermoplastic resin whose adhesion is reduced by heat treatment, and is formed of a material softened by heating, a material in which a microcapsule that expands by heating or a foaming agent is mixed, a material obtained by imparting thermal fusibility or a thermal decomposition property to a thermosetting resin, or a material in which interface strength is deteriorated due to penetration of moisture or a water-absorbent resin expands due to deterioration of interface strength. In this specification, the first flexible substrate 822 including the flexible insulating layer and the adhesive layer is also referred to as a thermal-separation supporting substrate.

Instead of a thermal-separation supporting substrate, a thermal-separation film formed of a film whose adhesion is reduced by heat treatment, a UV (ultraviolet) separation film whose adhesion is reduced by UV (ultraviolet) irradiation, or the like may be used. The UV separation film is formed by stacking an insulating layer and an adhesive layer whose adhesion is reduced by UV (ultraviolet) irradiation.

Figure 9C:
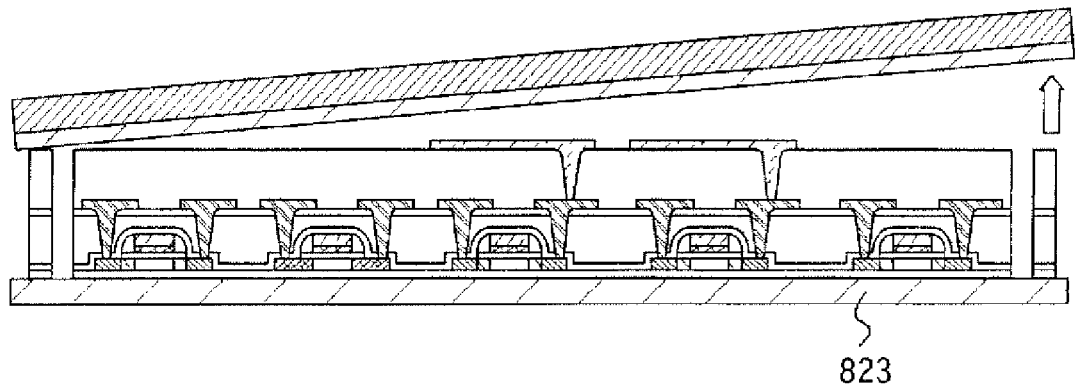

Next, a second flexible substrate 823 adheres to a side of the semiconductor element 821, which has been in contact with the glass substrate 801, and the first flexible substrate 822 is separated (see FIG. 9C). When the first flexible substrate 822 is separated, the semiconductor element is exposed. Accordingly, a protection substrate having flexibility may be attached in order to protect the semiconductor element.

As each of the first flexible substrate 822 and the second flexible substrate 823, a plastic film, paper, or the like can be used. It is preferable that two flexible substrates serving as the upper and lower substrates by which the semiconductor element is interposed have approximately the same thickness and the semiconductor element be approximately centrally arranged so that a completed semiconductor device is not affected by the outside.

When the semiconductor element 821 is attached to a flexible substrate having a curved surface or when the semiconductor device formed as described above is bent in use, a direction in which a carrier of the semiconductor element flows (a channel length direction) and a direction of the curve are made the same; thus, the semiconductor element can be less affected.

In this embodiment, a method where the separation layer 802 is etched from the opening portion 820, and thereafter, the semiconductor element 821 is transferred to the first flexible substrate 822 is described; however, the invention is not limited to such a method. For example, a method where the separation layer 802 is etched only in the etching step, and thereafter, the semiconductor element 821 is transferred to another substrate may be employed. Alternatively, a method where the semiconductor element 821 is separated from the glass substrate by attachment of the first flexible substrate 822 without provision of the opening portion 820, or a method where the glass substrate 801 is polished from a back surface thereof may be employed. These methods may be combined as appropriate.

Since a step for transferring the semiconductor element 821 to another substrate is used except for a method where the glass substrate is polished from a back surface, the glass substrate 801 for forming the semiconductor element 821 can be reused.

In such a manner, a thin film transistor included in each circuit forming the device of the invention can be formed.

Embodiment 2

In this embodiment, a manufacturing method of the device described in Embodiment Modes 1 and 2, which is different from the manufacturing method described in Embodiment 1, is described. In this embodiment, a silicon on insulator (hereinafter referred to as SOI) substrate is used for a substrate, and a thin film transistor is formed on an SOI substrate.

First, an SOI substrate is prepared. In this embodiment, a substrate in which a base insulating film is formed on a supporting substrate and a semiconductor film is formed on the base insulating film is used. For the SOI substrate, a known SOI substrate can be used, and there are no particular limitations on a manufacturing method and a structure of the SOI substrate. Typical examples of the SOI substrate include a SIMOX substrate and a bonded substrate. Further, examples of the bonded substrate include ELTRAN (registered trademark), UNIBOND (registered trademark), and Smart Cut (registered trademark).

In the case of the SIMOX substrate, an oxygen ion is implanted into a single crystalline silicon substrate, and heat treatment at 1300° C. or more is performed to form a buried oxide (BOX) film layer; thus, a thin-film silicon layer is formed on the surface of the single crystalline silicon substrate, and an SOI structure can be obtained. The thin-film silicon layer is insulated from the single crystalline silicon substrate with the buried oxide film layer. Further, a technique called internal thermal oxidation (ITOX) in which further thermal oxidation is performed can be used after the buried oxide film layer is formed.

In the case of the bonded substrate, two single crystalline silicon substrates (referred to as a first single crystalline silicon substrate and a second single crystalline silicon substrate) are bonded to each other with an oxide film layer interposed therebetween, and one of the single crystalline silicon substrates is thinned from a surface on the side which is opposite to the bonded side; thus, a thin-film silicon layer is formed on the surface, and an SOI structure can be obtained. The oxide film layer can be formed by thermal oxidation of one of the substrates (here, the first single crystalline silicon substrate). Further, the two single crystalline silicon substrates can be bonded directly without using an adhesive. For example, after the oxide film layer is formed by heat treatment of the first single crystalline silicon substrate, the first single crystalline silicon substrate overlaps with the second single crystalline silicon substrate, and heat treatment at 800° C. or more, preferably at approximately 1100° C. is performed; thus, the two substrates can bond to each other by chemical bonding at the bonding interface. Thereafter, the second single crystalline silicon substrate is polished from a surface on the side which is opposite to the bonding interface, so that the thin-film silicon layer with a desired thickness can be formed. Note that a technique called Smart Cut (registered trademark) can also be used. In Smart Cut, without polishing the second single crystalline silicon substrate after bonding, a hydrogen ion is implanted into a region at a predetermined depth in the second single crystalline silicon substrate to form a microvoid, and the microvoid grows by heat treatment to cleave the substrate. Further, it is possible to use a technique called plasma assisted chemical etching (PACE) in which after the second single crystalline silicon substrate is polished, the substrate is etched to be thin by small plasma etching equipment while the thickness of the substrate is locally controlled.

In the SOI substrate described in this embodiment, the supporting substrate is the single crystalline silicon substrate, the base insulating film is the buried oxide film layer or the oxide film layer, and the semiconductor layer is the thin-film silicon layer formed on the surface.

The thin-film silicon layer which is a semiconductor layer is a single crystalline silicon layer. In manufacturing the SOI substrate, the thickness of the semiconductor layer can be selected as appropriate by controlling a condition such as the amount of polishing, the depth of ion implantation, or the like. For example, the semiconductor layer with a thickness of 40 to 200 nm can be formed. In this embodiment, the thin-film silicon layer is formed to a thickness of 10 to 150 nm, preferably 10 to 100 nm.

Next, the semiconductor layer is selectively etched to form an island-shaped silicon layer. At this time, the island-shaped silicon layer may be formed so that the end portion has a perpendicular shape or a tapered shape. The shape of the end portion of the island-shaped silicon layer can be adjusted by changing the etching condition or the like. The end portion of the island-shaped silicon layer is preferably formed to have a taper angle of 45° or more and less than 95°, and more preferably 60° or more and less than 95°. When the end portion of the island-shaped silicon layer is nearly perpendicular, a parasitic channel can be reduced.

It is preferable to form the island-shaped silicon layer so that the end portion includes an insulating layer. The insulating layer is formed of a silicon oxide based material, a silicon nitride based material, or a material such as SiOF, SiOC, DLC, or porous silica by a CVD method or a sputtering method. An insulating film which is a precursor of the insulating layer is formed so as to cover the semiconductor layer and selectively etched by anisotropic etching mainly in a perpendicular direction; thus, the insulating layer is formed. There is no particular limitation on an etching method for forming the insulating layer as long as anisotropic etching mainly in a perpendicular direction can be performed. For example, reactive ion etching (RIE) can be used. The reactive ion etching is classified depending on a plasma generation method as a parallel-plate type, a magnetron type, a dual-frequency type, an ECR type, a helicon type, an ICP type, or the like. As an etching gas used at this time, a gas which can provide high etching selectivity of the insulating layer to the substrate and the silicon layer is selected. When the insulating film is selectively etched, a fluorine-based gas such as $CHF_3$, $CF_4$, $C_4F_8$, $C_2F_6$, or $NF_3$ can be used, for example. Further, an inert gas such as He, Ar, or Xe, an $O_2$ gas, or an $H_2$ gas may be added as appropriate.

Thereafter, a gate insulating layer is formed similarly to Embodiment 1. Subsequent steps are performed similarly to Embodiment 1.

As described in this embodiment by using an SOI substrate, a device which can operate at high speed and has superior characteristics can be formed.

Embodiment 3

As a transistor included in the device of the invention, which is described in Embodiment Modes 1 and 2, a field effect transistor may be used. In this embodiment, a step for forming the device of the invention by using a field effect transistor is described with reference to FIG. 11.

Figure 11:
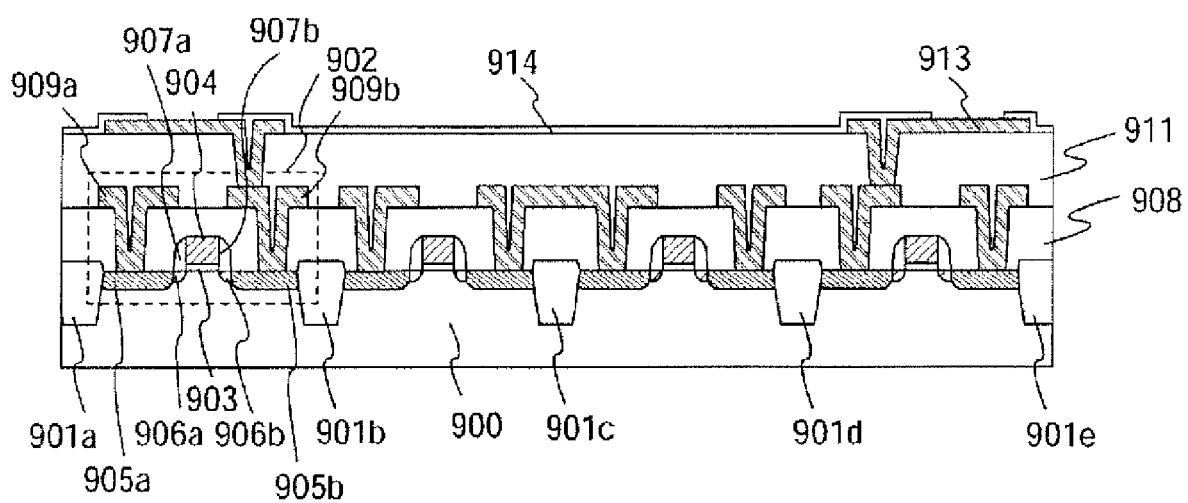
FIG. 11 illustrates a method for manufacturing a device included in a system of the invention.

FIG. 11 is a cross-sectional view of a part of a field effect transistor which can be applied to the invention. Element isolation regions 901a to 901e are formed on a substrate 900. Field effect transistors 902 are formed between each of the element isolation regions 901a to 901e.

The field effect transistor 902 includes a gate insulating layer 903 formed over the substrate 900; a gate electrode layer 904 formed over the gate insulating layer 903; a source/drain region 905a; a source/drain region 905b; sidewalls 907a and 907b provided at side portions of the gate electrode layer 904; an interlayer insulating layer 908 formed over the gate electrode layer 904 and the sidewalls 907a and 907b; LDD regions 906a and 906b; a source/drain wiring 909a connected to the source/drain region 905a; and a source/drain wiring 909b connected to the source/drain region 905b.

The substrate 900 is a single crystalline silicon substrate or a compound semiconductor substrate and is typically an n-type or p-type single crystalline silicon substrate, a GaAs substrate, an InP substrate, a GaN substrate, a SiC substrate, a sapphire substrate, a ZnSe substrate, or the like. In this embodiment, an n-type single crystalline silicon substrate is used as the substrate 900.

The element isolation regions 901a to 901e can be formed by a known local oxidation of silicon (LOCOS) method or shallow trench isolation (STI) method, or the like. In this embodiment, the element isolation regions 901a to 901e are formed of a silicon oxide layer by a trench isolation method.

The gate insulating layer 903 is formed by oxidizing the single crystalline silicon substrate by thermal oxidation or high-density plasma. The gate electrode layer 904 can be formed of a polycrystalline silicon layer with a thickness of 100 to 300 nm or can have a stacked-layer structure in which a silicide layer such as a tungsten silicide layer, a molybdenum silicide layer, or a cobalt silicide layer is provided over the polycrystalline silicon layer. Further, for the gate electrode layer 904, a tungsten nitride layer and a tungsten layer may be stacked over the polycrystalline silicon layer.

As the source and drain regions 905a and 905b, a heavily-doped n-type impurity region obtained by adding phosphorus to a p-well region or a heavily-doped p-type impurity region obtained by adding boron to an n-well region can be used. As the LDD regions 906a and 906b, a lightly-doped n-type impurity region obtained by adding phosphorus to the p-well region or a lightly-doped p-type impurity region obtained by adding boron to the n-well region can be used. Since the n-type single crystalline silicon substrate is used in this embodiment, the source and drain regions including heavily-doped p-type impurity regions and the LDD regions including lightly-doped p-type impurity regions are formed by adding boron to the substrate.

Note that the source and drain regions 905a and 905b may include silicide such as manganese silicide, tungsten silicide, titanium silicide, cobalt silicide, or nickel silicide. When silicide is included in surfaces of the source and drain regions, contact resistance between the source and drain wirings and the source and drain regions can be reduced.

An insulating layer is formed of silicon oxide over the substrate by a CVD method and anisotropically etched by a reactive ion etching (RIE) method; thus, the sidewalls 907a and 907b are formed.

The interlayer insulating layer 908 is formed of an inorganic insulating material such as silicon oxide or silicon oxynitride or an organic insulating material such as an acryl resin or a polyimide resin. When a coating method such as a spin coating method or a roll coating method is used, an insulating layer is formed by applying an insulating film material dissolved in an organic solvent and performing heat treatment. In this embodiment, the interlayer insulating layer 908 is formed using silicon oxide.

The source and drain wirings 909a and 909b are preferably formed by interposing a low resistance material such as aluminum between refractory metal materials such as titanium or molybdenum, for example, a stacked-layer structure of titanium and aluminum or a stacked-layer structure of molybdenum and aluminum.

An interlayer insulating layer 911 is formed over the interlayer insulating layer 908 and the source and drain wirings 909a and 909b. The interlayer insulating layer 911 is formed similarly to the interlayer insulating layer 908. Further, a conductive layer 913 to be connected to the field effect transistor 902 is provided over the interlayer insulating layer 911.

In addition, an insulating layer 914 may be formed so as to cover the interlayer insulating layer 911 and a part of the conductive layer 913. The insulating layer 914 functions as a protective layer and is preferably formed of silicon nitride, silicon oxide, silicon nitride oxide, silicon oxynitride, diamond-like carbon (DLC), or the like.

The semiconductor device of the invention includes an antenna. Similarly to Embodiment 1, an antenna can be formed over a field effect transistor. For example, the conductive layer 913 can be used as a conductive layer functioning as an antenna. Alternatively, an insulating layer may be formed over the conductive layer 913 similarly to the interlayer insulating layer 911, and a conductive film functioning as an antenna may be formed over the insulating layer.

Alternately, as described in Embodiment 1, an antenna can be formed over another substrate and attached later. As described in Embodiment 1 with reference to FIG. 10C, the antenna 832 formed over another substrate and the semiconductor element are made to be electrically connected to each other. In this case, the conductive layer 913 in FIG. 11 may serve as a wiring for connecting the antenna and the semiconductor element.

As described above, a device included in the semiconductor device of the invention can be formed.

Embodiment 4

In this embodiment, an example of a manufacturing method of the detection portion 114 described in Embodiment Modes 1 and 2 is described with reference to drawings. In this embodiment, the case where an optical sensor is used as a device is briefly described.

Figure 12A:
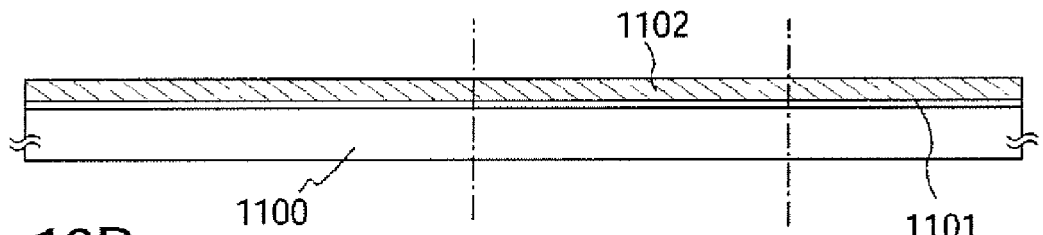
FIGS. 12A to 12E illustrate a method for manufacturing a device included in a system of the invention.

First, a base insulating layer 1101 and a conductive layer 1102 are formed over a substrate 1100 (see FIG. 12A). In this embodiment, a film in which tantalum nitride with a thickness of 30 nm and tungsten with a thickness of 370 nm are stacked is used as the conductive layer 1102.

Alternatively, as the conductive layer 1102, a single layer of an element selected from titanium, tungsten, tantalum, molybdenum, neodymium, cobalt, zirconium, zinc, ruthenium, rhodium, palladium, osmium, iridium, platinum, aluminum, gold, silver, or copper; a single layer of an alloy material or a compound material containing the aforementioned element as its main component; or a single layer of a nitride of the aforementioned element, such as titanium nitride, tungsten nitride, tantalum nitride, or molybdenum nitride, can be used.

Note that the conductive layer 1102 may be formed directly on the substrate 1100 without forming the base insulating layer 1101 over the substrate 1100.

Figure 12B:
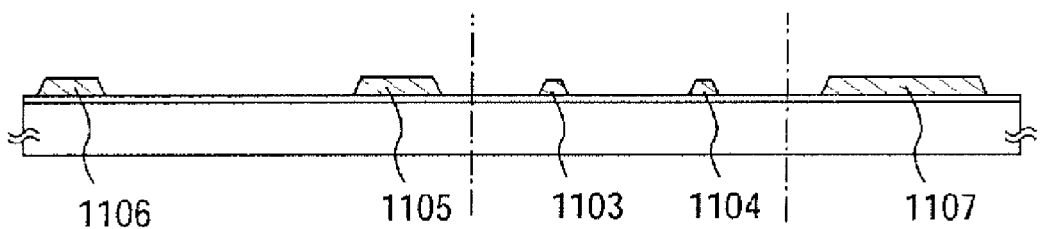
Figure 12C:
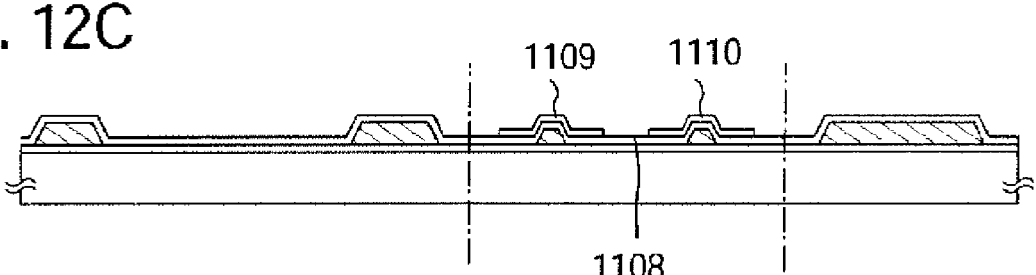

Next, the conductive layer 1102 is etched to have a desired pattern, and gate electrode layers 1103 and 1104, wirings 1105 and 1106, and a terminal electrode 1107 are formed (see FIG. 12B).

Next, a gate insulating layer 1108 is formed to cover the gate electrode layers 1103 and 1104, the wirings 1105 and 1106, and the terminal electrode 1107. In this embodiment, an insulating film containing silicon as its main component is used for the gate insulating layer. For example, the gate insulating layer 1108 is formed by a plasma CVD method using a silicon oxide film which contains nitrogen (a composition ratio: Si=32%, O=59%, N=7%, and H=2%) and has a thickness of 115 nm.

Next, island-shaped semiconductor regions 1109 and 1110 are formed over the gate insulating layer 1108. First, an amorphous silicon film containing argon, which serves as a gettering site, is formed to a thickness of 10 to 400 nm by a sputtering method. The amorphous silicon film containing argon is formed under an atmosphere containing argon by using a silicon target. Thereafter, heat treatment in a furnace heated at 650° C. is performed to remove (getter) a catalytic element. Thus, the catalytic element concentration in the semiconductor film having a crystalline structure is reduced. A lamp annealing device may be used instead of the furnace. Next, the amorphous silicon film containing argon, which is the gettering site, is selectively removed using a barrier layer as an etching stopper, and the barrier layer is selectively removed with a diluted hydrofluoric acid. Note that since nickel tends to move to a region having high oxygen concentration at the time of gettering, it is preferable to remove the barrier layer formed of an oxide film after gettering. When crystallization of the semiconductor film with the use of a catalytic element is not performed, the above steps such as formation of the barrier layer, formation of the gettering site, heat treatment for gettering, removal of the gettering site, and removal of the barrier layer are not necessary. Then, a thin oxide film is formed with ozone water on the surface of the obtained semiconductor film having a crystalline structure (e.g., a crystalline silicon film). Thereafter, a resist mask is formed using a first photomask, and etching treatment is performed to obtain a desired shape; thus, island-shaped semiconductor regions which have island shapes and thus are separated from each other are formed.

After the island-shaped semiconductor regions are formed, the resist mask is removed. Next, a very small amount of an impurity element (boron or phosphorus) is added in order to control a threshold value of a thin film transistor, as needed. In this embodiment, an ion doping method in which diborane ($B_2H_6$) is excited by plasma without mass separation is used.

Figure 12D:
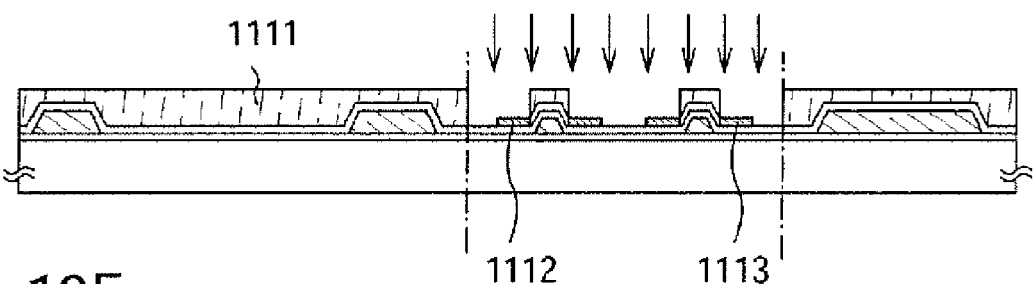

After the island-shaped semiconductor regions 1109 and 1110 are formed as described above, a mask 1111 is formed to cover regions other than regions serving as source and drain regions 1112 of a thin film transistor 1119 and source and drain regions 1113 of a thin film transistor 1120, and an impurity element imparting one conductivity is introduced (see FIG. 12D). As the impurity element imparting one conductivity, phosphorus or arsenic should be used to form an n-channel thin film transistor, and boron should be used to form a p-channel thin film transistor. In this embodiment, phosphorus which is an n-type impurity is introduced into the island-shaped semiconductor regions 1109 and 1110; thus, the source and drain regions 1112 of the thin film transistor 1119, a channel formation region therebetween, the source and drain regions 1113 of the thin film transistor 1120, and a channel formation region therebetween are formed. Note that a very small amount of an impurity element (boron or phosphorus) may be added to the channel formation region in order to control a threshold value of the thin film transistor, as needed.

Figure 12E:
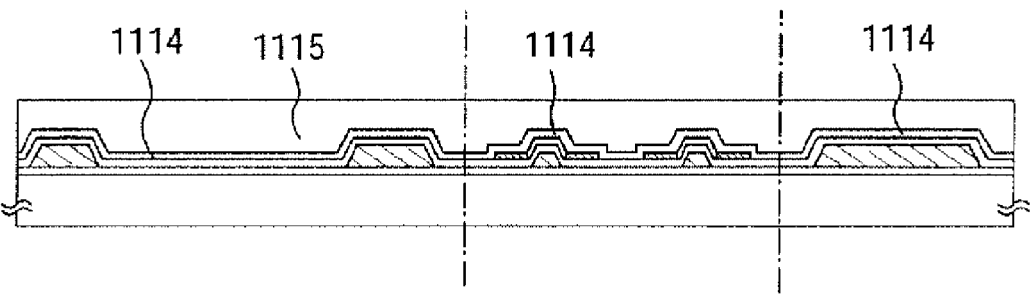

Next, the mask 1111 is removed, and insulating films 1114 and 1115 are formed (see FIG. 12E). The insulating films 1114 and 1115 are formed of silicon oxide, silicon nitride, or the like by a CVD method or the like.

Next, contact holes are formed in the insulating films 1114 and 1115. Then, a conductive film is formed and selectively etched; thus, a wiring 1117, a connection electrode 1118, a terminal electrode 1125, source and drain electrodes 1127 of the thin film transistor 1119, and source and drain electrodes 1128 of the thin film transistor 1120 are formed. Then, a resist mask is removed. Note that the conductive film in this embodiment has a three-layer structure of a titanium film with a thickness of 100 nm, an aluminum film with a thickness of 350 nm, which contains a very small amount of silicon, and a titanium film with a thickness of 100 nm.

Figure 13A:
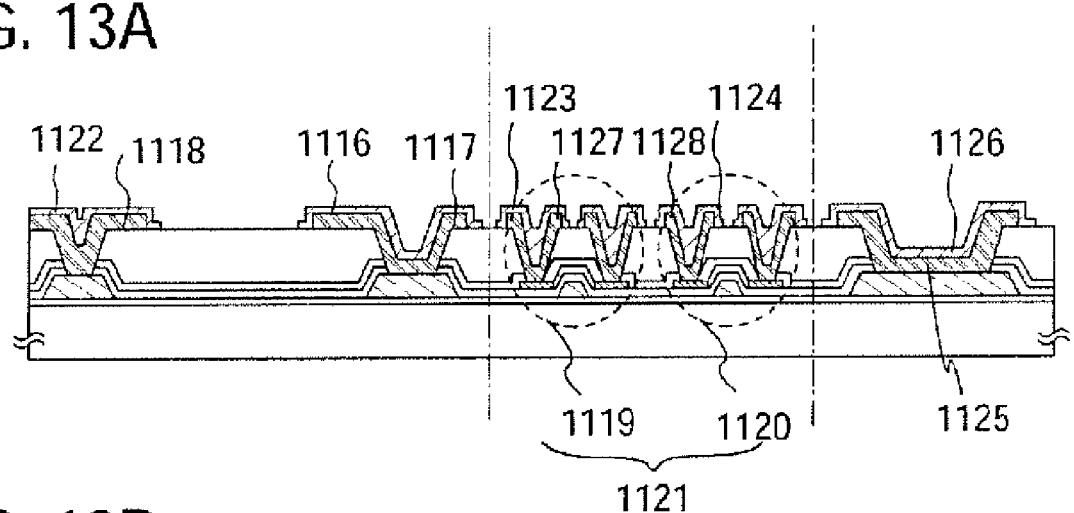
FIGS. 13A to 13C illustrate a method for manufacturing a device included in a system of the invention.
Figure 13B:
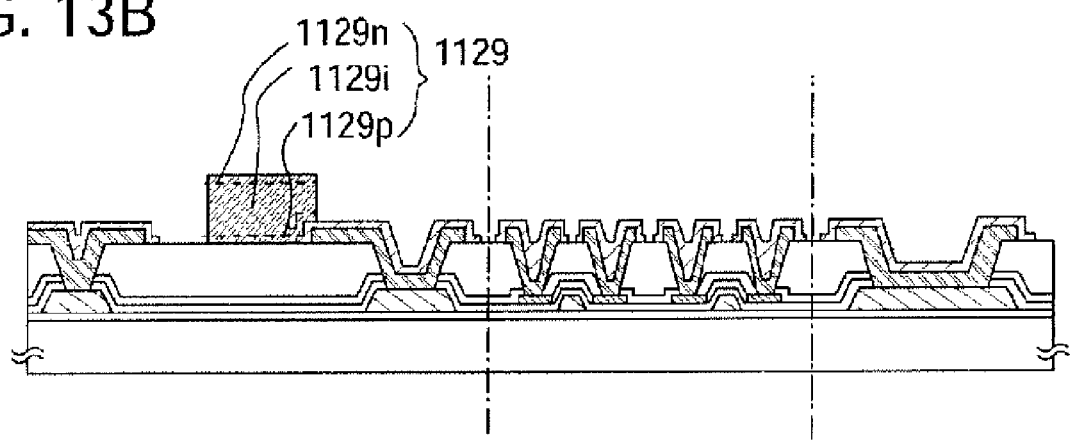
Figure 13C:
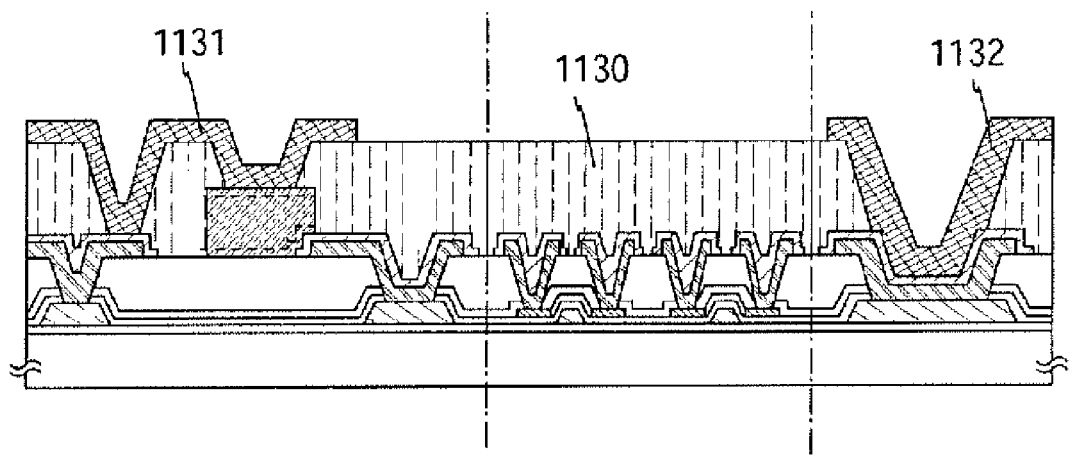

In FIGS. 13A to 13C, the wiring 1117 includes a protective electrode 1116, the connection electrode 1118 includes a protective electrode 1122, the terminal electrode 1125 includes a protective electrode 1126, the source and drain electrodes 1127 of the thin film transistor 1119 include protective electrodes 1123, and the source and drain electrodes 1128 of the thin film transistor 1120 include protective electrodes 1124; however, the protective electrodes are not necessarily provided when not needed.

As described above, the bottom-gate thin film transistors 1119 and 1120 can be formed (see FIG. 13A).

Next, a photoelectric conversion layer 1129 including a p-type semiconductor layer 1129p, an i-type semiconductor layer 1129i, and a n-type semiconductor layer 1129n is formed over the insulating film 1115 (see FIG. 13B). Typically, the photoelectric conversion layer is formed using amorphous silicon.

The p-type semiconductor layer 1129p may be formed by deposition of an amorphous silicon film containing an impurity element belonging to Group 13 (e.g., boron) by a plasma CVD method. Alternatively, an impurity element belonging to Group 13 may be introduced after an amorphous silicon film is formed.

For the i-type semiconductor layer 1129i, an amorphous silicon film may be formed by a plasma CVD method, for example. Further, for the n-type semiconductor layer 1129n, an amorphous silicon film containing an impurity element belonging to Group 15 (e.g., phosphorus) may be formed. Alternatively, an impurity element belonging to Group 15 may be introduced after an amorphous silicon film is formed.

As described above, after the p-type semiconductor layer 1129p is formed, the i-type semiconductor layer 1129i and the n-type semiconductor layer 1129n are sequentially formed. In such a manner, the photoelectric conversion layer 1129 including the p-type semiconductor layer 1129p, the i-type semiconductor layer 1129i, and the n-type semiconductor layer 1129n is formed.

Alternatively, the p-type semiconductor layer 1129p, the i-type semiconductor layer 1129i, and the n-type semiconductor layer 1129n may be semi-amorphous semiconductor films. Note that a semi-amorphous semiconductor film refers to a film having a structure intermediate between those of an amorphous semiconductor film and a semiconductor film having a crystalline structure (including a single crystalline semiconductor and a polycrystalline semiconductor).

Next, a sealing layer 1130 and terminals 1131 and 1132 are formed (see FIG. 13C). The terminal 1131 is connected to the n-type semiconductor layer 1129n. The terminal 1132 is formed in the same step as the terminal 1131.

Then, a substrate 1137 provided with electrodes 1135 and 1136 is mounted by solders 1133 and 1134. Note that the electrode 1135 provided on the substrate 1137 is mounted on the terminal 1131 by the solder 1134. Similarly, the electrode 1136 provided on the substrate 1137 is mounted on the terminal 1132 by the solder 1133 (see FIG. 14).

Figure 14:
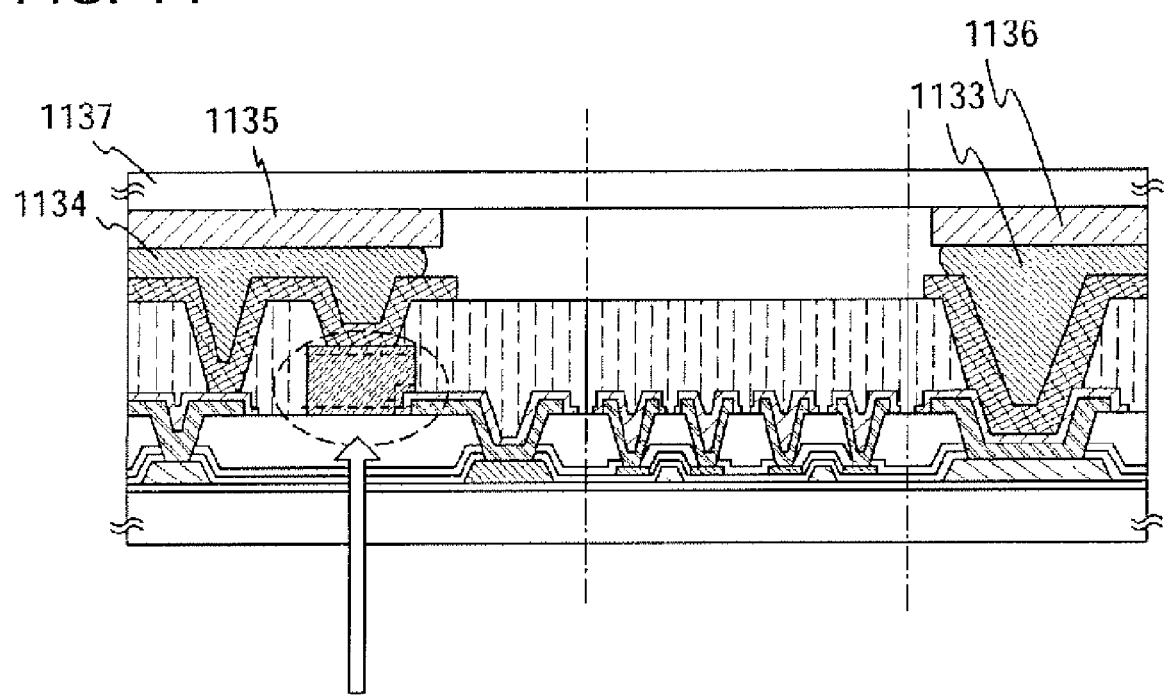
FIG. 14 illustrates a method for manufacturing a device included in a system of the invention.

In a semiconductor device shown in FIG. 14, it is preferable that light enter the photoelectric conversion layer 1129 mainly from the substrate 1100 side; however, the invention is not limited thereto.

Note that in this embodiment, a bottom-gate thin film transistor is used as an example; however, die invention is not limited thereto, and a top-gate thin film transistor may be used.

As described above, an optical sensor used for the detection portion 114 can be formed.

Embodiment 5

In this embodiment, specific examples of using the individual management system of the invention are described.

Figure 15A:
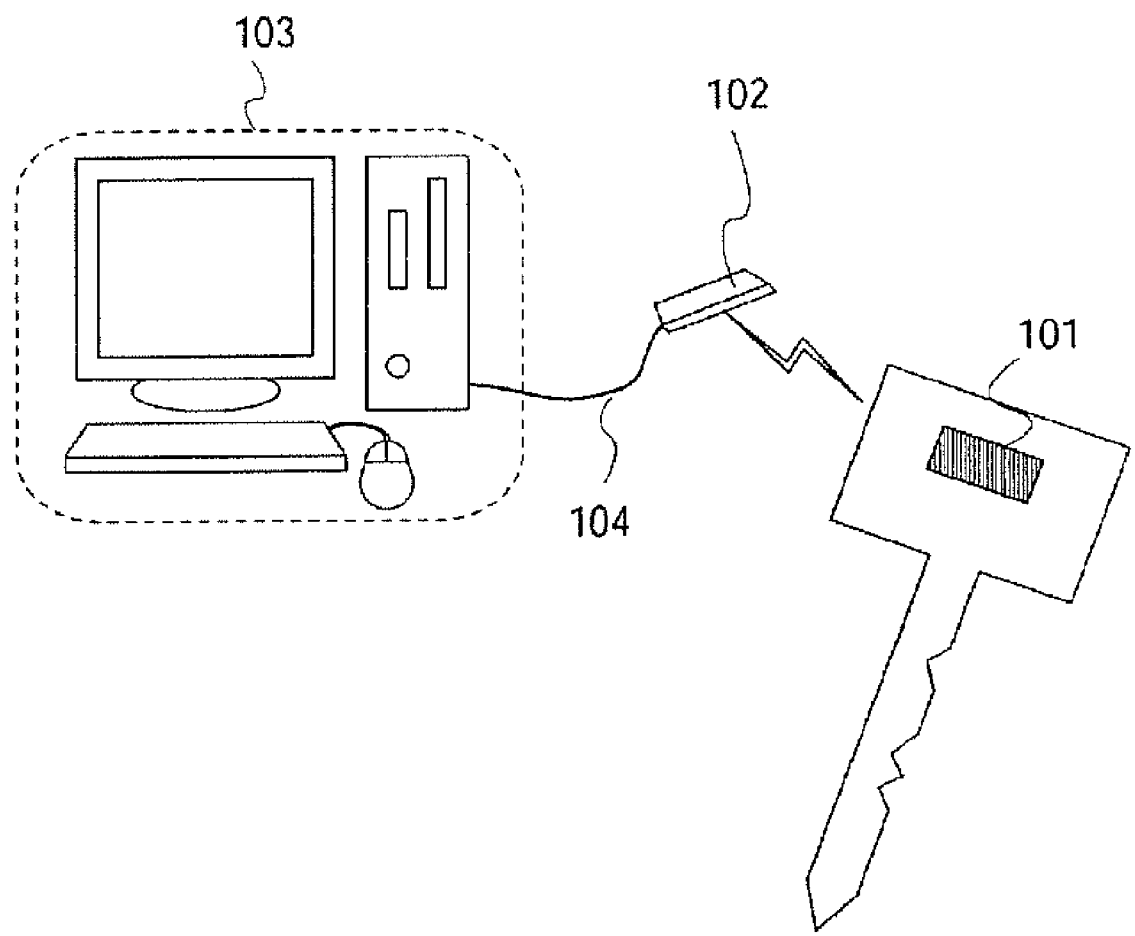
FIGS. 15A and 15B each illustrate a specific example of an individual management device which is a component of a system of the invention.

FIG. 15A shows an image of the system of the invention. The individual management device 101, the individual identification device 102, the individual information management device 103, and the communication line 104 are shown. In FIG. 15A, the individual management device 101 is attached to a managed object. The individual management device 101 is shaped like a thin sticker in FIG. 15A. When the individual management device 101 is shaped like a small thin sticker, it can be attached to a variety of products. Further, when the individual management device 101 has flexibility and thus can be bent, it can also be attached to a curved surface. Such a thin and flexible individual management device 101 can be formed using a flexible substrate such as plastic, which is provided with a thin film transistor.

When the managed product is in a physically severe situation, however, the individual management device 101 needs to be protected. Therefore, a thick protective layer may be formed of a resin or the like over the individual management device 101 which is shaped like a sticker shape, so that the individual management device 101 can be shaped like a dome sticker.

When processing such as formation of a protective layer on a surface of the individual management device 101 is performed, the appearance of the individual management device 101 can be modified, for example, printing of a design on the top surface can be performed. A shape or a design that evokes a sense of beauty is attached to the surface of the individual management device 101; thus, the design value of the individual management device 101 can be improved.

Figure 15B:
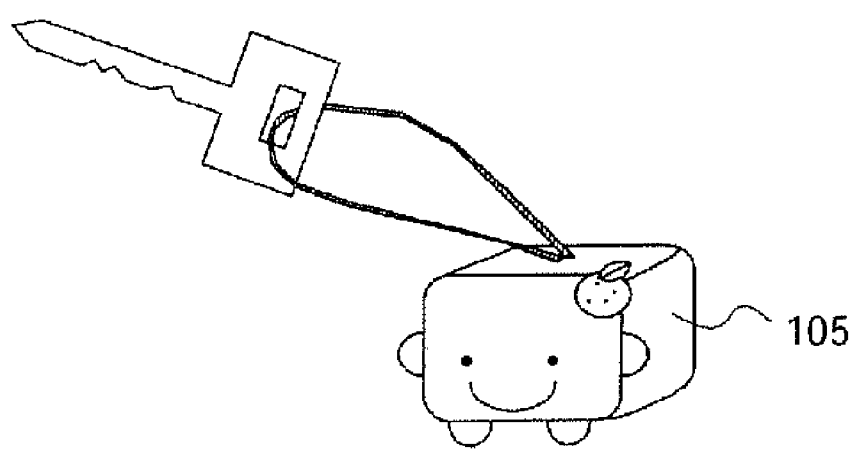

In addition, the appearance of the individual management device 101 can be formed so that the individual management device 101 serves as a part of accessories of the managed product. For example, when the managed project is a key as shown in FIG. 15B, the shape of the individual management device may be formed like a key ring 105, which is formed by incorporating the individual management device formed using a semiconductor integrated circuit in a doll, a plushie, or the like. For example, when the plushie in which the individual management device is incorporated is formed of a material with impact resistance, the individual management device can be protected from impact or the like, similarly to the aforementioned example.

When the individual management device 101 is provided with a variety of sensors and a plurality of antennas having different functions, the size of the device is increased. In such a case, provision of the individual management device in the plushie is effective because the individual management device requires no additional space.

In addition, the appearance and the shape of the individual management device 101 can be changed depending on a mode of a managed object. For example, when the managed project is a seal, which is often kept in a seal case, the sticker-shaped individual management device 101 can be attached to the seal case or the individual management device 101 can be provided inside the seal case.

As described above, the individual management device 101 can have a variety of shapes depending on user's demand.

FIGS. 16A to 16D show examples of appearances of the individual identification device 102. The appearance of the individual identification device 102 is determined by the shape of the antenna included in the resonant circuit 210 or the notice-to-user portion 125.

Figure 16A:
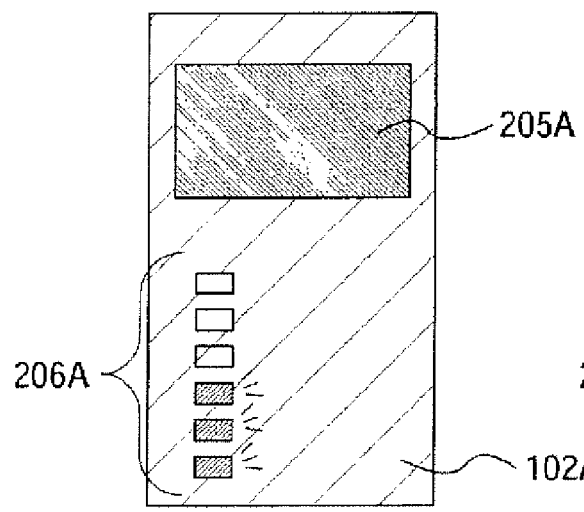
FIGS. 16A to 16D each illustrate a specific example of an individual identification device which is a component of a system of the invention.
Figure 16B:
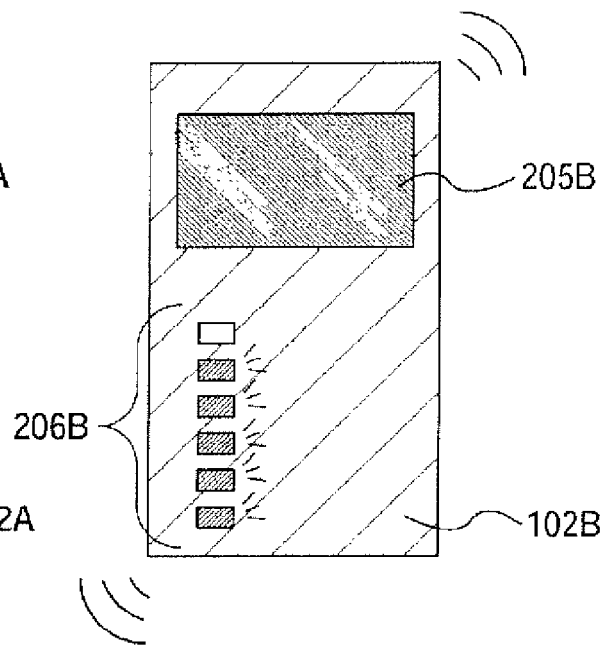

FIGS. 16A and 16B each show an example of the individual identification device 102 whose appearance is determined by the shape of the notice-to-user portion 125. Individual identification devices 102A and 102B include display portions 205A and 205B respectively, and lighting display portions 206A and 206B respectively. The display portions 205A and 205B are provided using flat displays such as liquid crystal display devices or EL display devices, and display a distance to a managed object, a direction in which the individual management device exists, a layout of a room in which the managed object is searched or the like when the individual management device 101 is used. Further, since the individual management device 101 includes the detection portion 114, information detected by the detection portion 114 may be displayed on the display portion 205A or 205B.

In addition, an area such as a layout of a room where the individual management system is used may be stored in advance in the individual information management device 103; thus, the individual management area can be displayed on the display portions 205A and 205B when the system is used. For example, an area where the individual management system is used is specified at the time of registration, and a map or a layout of a room, and the like related to the area is stored. Then, when the system is used for example, the display portion 205A or 205B included in the individual identification device 102A or 102B can display the location of the individual management device 101 on the map or room layout.

In the lighting display portions 206A and 206B, a plurality of light-emitting elements may be arranged in lines. For example, more light-emitting elements may emit light gradually as a distance between the individual management device 101 and the individual identification device 102 is reduced.

FIG. 16B shows an example where the individual identification device 102 includes a vibrator in addition to the aforementioned structure. For example, the individual identification device 102B may vibrate more strongly as a distance between the individual management device 101 and the individual identification device 102B is reduced. Alternatively, the individual identification device 102B may be provided with a directional antenna, and the individual identification device 102B may vibrate strongly when the individual management device 101 exists in a transmission direction of the directional antenna of the individual identification device 102B. As described above, when the system has a structure that allows users to know information through the senses, even a user who does not easily understand the structure of the system, such as a child, can easily use the system.

Figure 16C:
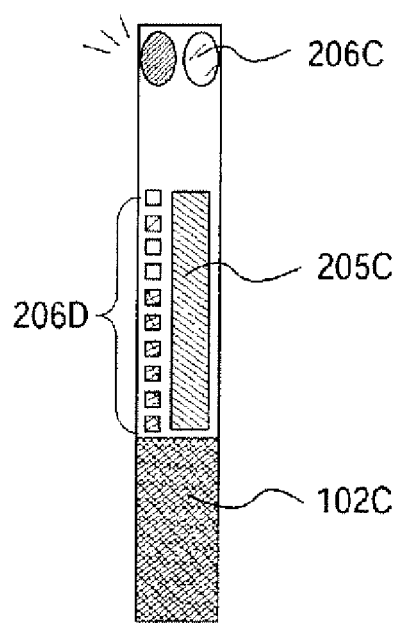
Figure 16D:
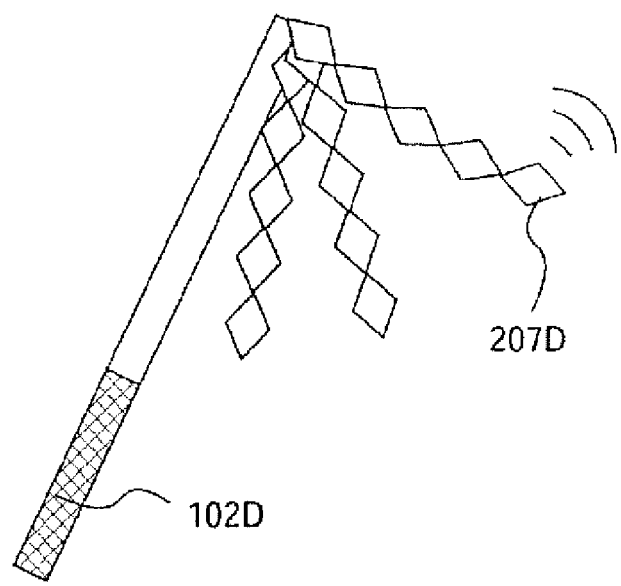

FIGS. 16C and 16D each show an example different from those in FIGS. 16A and 16B, in which the antenna included in the resonant circuit is incorporated in a housing of the individual identification device 102 and the shape of the individual identification device 102 is determined by the antenna. When long-distance communication is necessary, for example, when a distance between the individual management device 101 and the individual identification device 102 is several meters or more, the antenna included in the individual identification device 102 is preferably large. For example, when the individual management device 101 and the individual identification device 102 communicate with each other by an electric wave system, the individual identification device 102 needs to include a dipole antenna with a length equal to a wavelength of a radio wave, a half of the length of the wavelength, or a quarter of the length of the wavelength. When such an elongated antenna is necessary, the individual identification device 102 preferably has an elongated shape. Accordingly, the individual identification device 102 may have the shape as shown in FIGS. 16C and 16D.

When the antenna of the individual identification device 102 is a directional antenna the individual identification device 102 includes a plurality of antennas. In this case, the appearance of the individual identification device 102 is determined by shapes of the antennas.

For example, FIG. 16C shows an individual identification device 102C including a display portion 205C and lighting display portions 206C and 206D as an example. The display portion 205C and the lighting display portion 206C may be similar to the display portion 205A and the lighting display portion 206A in FIG. 16A. Information indicating whether the managed object is on the right side or the left side based on the individual identification device 102C can be displayed on the lighting display portions 206C and 206D.

Further, FIG. 16D shows an example where the individual identification device 102 includes a direction indicator (an inductor). A direction indicator 207D has a function of moving in a direction in which the individual management device 101 exists. The direction indicator 207D can be realized, for example, by an actuator including two sheets having conductivity only in one direction overlap in the same direction and end portions of the sheets are fixed, which is driven by supplying currents of different phases to the two sheets. Alternatively, an artificial muscle, for example, which is contracted by applying voltage may be used. The mode shown in FIG. 16D can give pleasure to the user when the user uses the system. It is needless to say that the individual identification device 102 can have a variety of appearances in addition to the aforementioned appearances.

Furthermore, an existing wireless communication device may be used instead of the individual identification device 102. Typically, a mobile phone can be used. When the functions of the individual identification device 102 are given to a mobile phone, the individual management system can be realized. In this case, the mobile phone has a similar structure to that of the individual identification device 102 in addition to the inherent structure of the mobile phone. Further, by using the inherent structure of the mobile phone, convenience of the individual management system can be improved. For example, the mobile phone can wirelessly communicate with another device by a method other than wireless communication performed by the individual management device 101 and the individual identification device 102. By using such a wireless communication function, the individual management system can have a structure in which the mobile phone serves as the individual identification device 102, and the mobile phone and the individual information management device 103 wirelessly communicate with each other. With such a structure, the individual identification device 102 can wirelessly communicate with both the individual management device 101 and the individual information management device 103; thus, convenience of the individual management system can be improved.

In addition, since the mobile phone is usually provided with an information input portion and an information output portion, the mobile phone can input and output information directly to the individual identification device 102 as well as the individual management device 101. Thus, the mobile phone may have a structure that incorporates both the identification device 102 the individual information management device 103. For the information input portion and the information output portion, a touch-panel display device as well as a common input button or switch may be used.

It is convenient for the user to input information with the use of the individual identification device 102 as described above when the user desires to search a plurality of managed objects at one time or desires to change a target object while searching, for example. Further, when the individual management device 101 includes a plurality of detection portions 114 and pieces of detection information obtained by the detection portions 114 vary, a given piece of information can be selected among the pieces of detection information directly by the individual identification device 102.

Embodiment 6

Figure 17A:
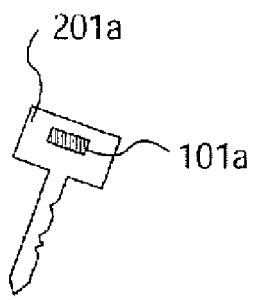
FIGS. 17A to 17G each illustrate a specific example in which an individual management device is attached to a managed object in order to utilize a system of the invention.
Figure 17B:
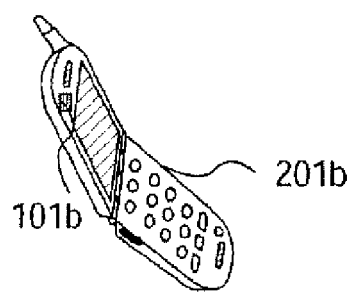
Figure 17C:
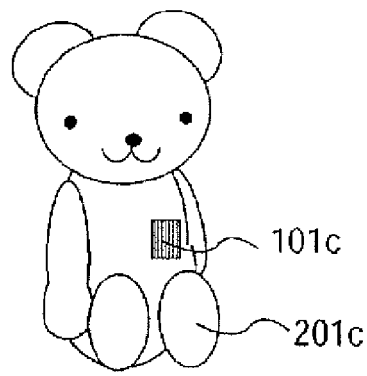
Figure 17D:
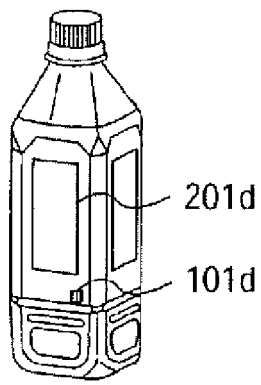
Figure 17E:
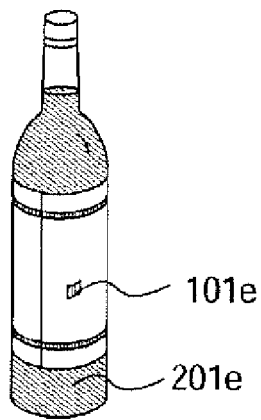
Figure 17F:
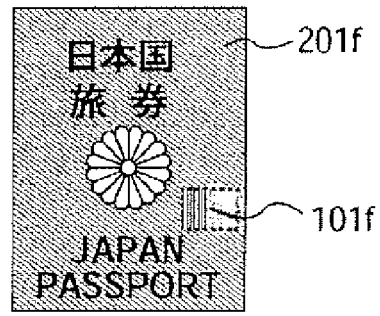
Figure 17G:
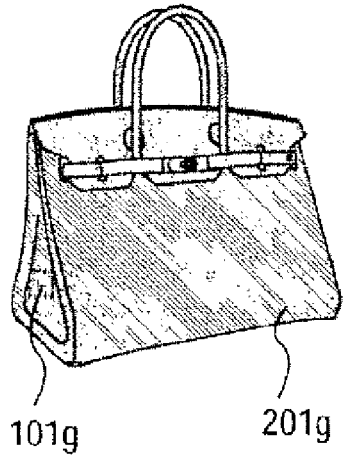

In this embodiment, specific examples of managed objects to which the individual management device 101 is attached are described. FIG. 17A shows the case where an individual management device 101*a* is attached to a key 201*a*. FIG. 17B shows the case where an individual management device 101*b* is attached to a mobile phone 201*b*. FIG. 17C shows the case where an individual management device 101*c* is attached to a stuffed toy 201*c*. FIG. 17D shows the case where an individual management device 101*d* is attached to a plastic bottle 201*d*. FIG. 17E shows the case where an individual management device 101*e* is attached to a bottle 201*e*. FIG. 17F shows the case where an individual management device 101*f* is attached to a passport 201*f* FIG. 17G shows the case where an individual management device 101*g* is attached to a bag 201*g*.

As described above, in the individual management system of the invention, the individual management device 101 can be attached to a variety of products.

This application is based on Japanese Patent Application serial No. 2007-080383 filed with Japan Patent Office on Mar. 26, 2007, the entire contents of which are hereby incorporated by reference.

REFERENCE NUMERALS

101: individual management device, 102: individual identification device, 103: individual information management device, 104: communication line, 105: key ring, 111: wireless commimication portion, 112: storage portion, 113: power storage portion, 114: detection portion, 121: wireless communication portion, 122: storage portion, 123: information processing portion, 124: circuit communication portion, 125: notice-to-user portion, 126: power storage portion, 127: imaging portion, 128: position analysis portion, 131: circuit communication portion, 132: information processing portion, 133: storage portion, 134: information input/output portion, 150: identification information, 151: individual information, 152: database, 210: resonant circuit, 211: demodulation circuit, 212: modulation circuit, 213: decoding circuit, 214: encoding circuit, 215: logic circuit, 216: power supply circuit, 217: rectifier circuit, 218: current/voltage control circuit, 219: charge control circuit, 220: battery, 230: sensor, 231: A/D converter circuit, 232: information processing circuit, 241: rectifier circuit, 242: comparison circuit, 243: comparison potential generation circuit, 251: antenna for reception, 252: directional antenna for transmission, 261: rectifier circuit, 262: comparison circuit, 263: comparison potential generation circuit, 264: communication power control circuit, 300: step, 301: step, 302: step, 303: step, 304: step, 305: step, 306: step, 307: step, 400: step, 401: step, 402: step, 406: step, 407: step, 408: step, 801: glass substrate, 802: separation layer, 803: insulating layer, 804: semiconductor layer, 805: gate insulating layer, 806: gate electrode layer, 807: n-type impurity region, 808: p-type impurity region, 809: insulating layer, 810: n-type impurity region, 811: n-type impurity region, 812: n-channel transistor, 813: p-channel transistor, 814: insulating layer, 815: conductive layer, 816, insulating layer, 817: conductive layer, 820: opening portion, 821: semiconductor element, 822: flexible substrate, 823: flexible substrate, 830: flexible substrate, 831: flexible substrate, 832: antenna, 900: substrate, 902: field effect transistor. 903: gate insulating layer, 904: gate electrode layer, 908: interlayer insulating layer, 911: interlayer insulating layer, 913: conductive layer, 914: insulating layer, 101*a*: individual management device, 101*b*: individual management device, 101*c*: individual management device, 101*d*: individual management device, 101*e*: individual management device, 101*f*: individual management device, 101*g*: individual management device, 102A: individual identification device, 102B: individual identification device, 102C: individual identification device, 1100: substrate, 1101: base insulating layer, 1102: conductive layer, 1103: gate electrode layer, 1104: gate electrode layer, 1105: wiring, 1106: wiring, 1107: terminal electrode, 1108: gate insulating layer, 1109: island-shaped semiconductor region, 1110: island-shaped semiconductor region, 1111: mask, 1112: source and drain regions, 1113: source and drain regions, 1114: insulating film, 1115: insulating film, 1116: protective electrode, 1117: wiring, 1118: connection electrode, 1119: thin film transistor, 1120: thin film transistor, 1122: protective electrode, 1123: protective electrode, 1124: protective electrode, 1125: terminal electrode, 1126: protective electrode, 1127: source and drain electrodes, 1128: source and drain electrodes, 1129: photoelectric conversion layer, 1130: sealing layer, 1131: terminal, 1132: terminal, 1133: solder, 1134: solder, 1135: electrode, 1136: electrode, 1137: substrate, 121*a*: wireless communication portion, 128*a*: position analysis portion, 150*a*: management number, 150*b*: system number, 150*c*: user number, 151*a*: name or the like, 151*b*: information, 151*e*: managed object image data, 151*d*: system password, 151*e*: registration operation record, 201*a*: key, 201*b*: mobile phone, 201*c*: stuffed toy, 201*d*: plastic bottle, 201*c*: bottle, 201*f*: passport, 201*g*: bag, 205A: display portion, 205B: display portion, 205C: display portion, 206A: lighting display portion, 206B: lighting display portion, 206C: lighting display portion, 206D: lighting display portion, 207D: direction indicator, 403A: step, 403B: step, 404A: step, 404B: step, 405A: step, 405B: step, 901*a*: element isolation region, 901*b*: element isolation region, 901*c*: element isolation region, 901*d*: element isolation region, 901*e*: element isolation region, 905*a*: source/drain region, 905*b*: source/drain region, 906*a*: LDD region, 906*b*: LDD region, 907*a*: sidewall, 907*b*: sidewall, 909*a*: source/drain wiring, 909*b*: source/drain wiring, 1129*i*: i-type semiconductor layer, 1129*n*: n-type semiconductor layer, 1129*p*: p-type semiconductor layer

What is claimed is:

1. An individual management system comprising:
  an individual management device configured to be attached to a managed object; and
  an individual identification device configured to wirelessly communicate with the individual management device,
  wherein the individual management device includes a detection portion which comprises a sensor selected from a temperature sensor, a humidity sensor, an acceleration sensor, an angular velocity sensor, and a magnetic sensor so that information on surroundings of the managed object is detected by the detection portion,
  wherein the individual identification device includes a position analysis portion configured to calculate a distance between the individual management device and the individual identification device, and
  wherein the information on the surroundings of the managed object and the calculated distance between the individual management device and the individual identification device are used to specify a position of the managed object.

2. The individual management system according to claim 1,
  wherein the individual identification device includes an antenna configured to receive transmission of an electromagnetic wave from the individual management device so that the distance between the individual management device and the individual identification device is calculated.

3. The individual management system according to claim 2,
  wherein the individual management device includes a current/voltage control circuit for generating a first power and a second power to be applied to the antenna, and
  wherein the first power is different from the second power.

4. The individual management system according to claim 1 further comprising:
  an individual information management device configured to perform wireless communication or wire communication with the individual identification device.

5. The individual management system according to claim 4,
wherein the individual information management device includes a storage portion configured to store information on the managed object.

6. The individual management system according to claim 5,
wherein the storage portion includes a nonvolatile memory.

7. The individual management system according to claim 5,
wherein the storage portion is a write-once nonvolatile memory.

8. The individual management system according to claim 4,
wherein the individual information management device is provided externally to the individual identification device or within the individual identification device.

9. The individual management system according to claim 1,
wherein the individual management device includes a power storage portion capable of being wirelessly charged.

10. The individual management system according to claim 1,
wherein the individual identification device includes at least one notice-to-user portion configured to inform a user of a communication situation with the individual management device.

11. The individual management system according to claim 10,
wherein the notice-to-user portion is at least one selected form the group comprised of a display device, a lighting element, a vibrator, a sound device, and a voice notification device.

12. The individual management system according to claim 10,
wherein the notice-to-user portion is a display portion configured to display a layout of a room so that the user views a position of the individual management device in relation to a position of the individual identification device.

13. The individual management system according to claim 1,
wherein the individual identification device includes an imaging portion configured to take an image of the managed object.

14. The individual management system according to claim 13,
wherein the imaging portion is a camera.

15. The individual management system according to claim 4,
wherein the individual information management device controls the wireless communication between the individual identification device and the individual management device so that the individual identification device communicates with the individual management device having a specific identification information.

16. An individual management system comprising:
an individual management device configured to be attached to a managed object; and
an individual identification device configured to wirelessly communicate with the individual management device,
wherein the individual management device includes a detection portion which comprises a sensor selected from a temperature sensor, a humidity sensor, an acceleration sensor, an angular velocity sensor, and a magnetic sensor so that information on surroundings of the managed object is detected by the detection portion,
wherein the individual identification device includes a position analysis portion configured to calculate a distance between the individual management device and the individual identification device, and determine a direction of the individual management device with respect to a position of the individual identification device,
wherein the information on the surroundings of the managed object, the calculated distance between the individual management device and the individual identification device, and the determined direction of the individual management device with respect to the position of the individual identification device are used to specify a position of the managed object.

17. The individual management system according to claim 16, wherein the individual identification device includes an antenna configured to have reception and directivity.

18. The individual management system according to claim 16,
wherein the individual identification device includes a first antenna configured to have reception and a second antenna configured to have directivity.

19. The individual management system according to claim 16 further comprising:
an individual information management device configured to perform wireless communication or wire communication with the individual identification device.

20. The individual management system according to claim 19,
wherein the individual information management device includes a storage portion configured to store information on the managed object.

21. The individual management system according to claim 20,
wherein the storage portion includes a nonvolatile memory.

22. The individual management system according to claim 20,
wherein the storage portion is a write-once nonvolatile memory.

23. The individual management system according to claim 19,
wherein the individual information management device is provided externally to the individual identification device or within the individual identification device.

24. The individual management system according to claim 16,
wherein the individual management device includes a power storage portion capable of being wirelessly charged.

25. The individual management system according to claim 16,
wherein the individual identification device includes at least one notice-to-user portion configured to inform a user of a communication situation with the individual management device.

26. The individual management system according to claim 25,
wherein the notice-to-user portion is at least one selected form the group comprised of a display device, a lighting element, a vibrator, a sound device, and a voice notification device.

27. The individual management system according to claim 25,
wherein the notice-to-user portion is a display portion configured to display a layout of a room so that the user views a position of the individual management device in relation to a position of the individual identification device.

28. The individual management system according to claim 16,
wherein the individual identification device includes an imaging portion configured to take an image of the managed object.

29. The individual management system according to claim 28,
wherein the imaging portion is a camera.

30. The individual management system according to claim 19, wherein the individual information management device controls the wireless communication between the individual identification device and the individual management device so that the individual identification device communicates with the individual management device having a specific identification information.

* * * * *